United States Patent
Takeda et al.

(10) Patent No.: US 8,236,208 B2
(45) Date of Patent: Aug. 7, 2012

(54) OPTICAL CELLULOSE ESTER FILM AND MANUFACTURING METHOD THEREOF, AND POLARIZING PLATE AND LIQUID CRYSTAL DISPLAY DEVICE

(75) Inventors: Akihiko Takeda, Sagamihara (JP); Kazuto Kiyohara, Kokubunji (JP); Satomi Kawabe, Hachioji (JP); Yasuki Nagai, Toyohashi (JP); Takayuki Suzuki, Hachioji (JP); Kazuaki Nakamura, Hachioji (JP); Takashi Konishi, Sagamihara (JP)

(73) Assignee: Konica Minolta Opto, Inc., Tokyo (JP)

( * ) Notice: Subject to any disclaimer, the term of this patent is extended or adjusted under 35 U.S.C. 154(b) by 1099 days.

(21) Appl. No.: 12/086,033

(22) PCT Filed: Nov. 14, 2006

(86) PCT No.: PCT/JP2006/322626
§ 371 (c)(1),
(2), (4) Date: Jun. 4, 2008

(87) PCT Pub. No.: WO2007/069420
PCT Pub. Date: Jun. 21, 2007

(65) Prior Publication Data
US 2009/0081388 A1   Mar. 26, 2009

(30) Foreign Application Priority Data
Dec. 12, 2005 (JP) .................................. 2005-357807

(51) Int. Cl.
*G02B 1/04* (2006.01)
(52) U.S. Cl. ...... 264/1.29; 264/1.34; 264/211; 428/1.33
(58) Field of Classification Search ............... 428/1.31, 428/1.33, 1.54; 349/96, 122; 106/168.01, 106/169.39, 170.15, 170.18; 264/1.29, 1.34, 264/211
See application file for complete search history.

(56) References Cited

U.S. PATENT DOCUMENTS

| | | | |
|---|---|---|---|
| 2003/0037703 A1* | 2/2003 | Saito | 106/169.33 |
| 2003/0097963 A1* | 5/2003 | Schunk et al. | 106/170.11 |
| 2003/0156235 A1* | 8/2003 | Kuzuhara et al. | 349/96 |
| 2003/0171458 A1* | 9/2003 | Buchanan et al. | 524/32 |
| 2005/0106334 A1* | 5/2005 | Kubo et al. | 428/1.31 |

FOREIGN PATENT DOCUMENTS

| | | |
|---|---|---|
| CN | 1619344 A | 5/2005 |
| JP | 05-194789 A | 8/1993 |
| JP | 2000-352620 A | 12/2000 |
| JP | 2001-072782 | 3/2001 |
| JP | 2005-148110 A | 6/2005 |
| JP | 2005-178194 A | 7/2005 |

OTHER PUBLICATIONS

JPO Website Machine English Translation of JP 2000-352620, Murakami et al., Dec. 19, 2000.*
Triacetin, Wikipedia, Wikimedia Foundation, Inc., May 16, 2011.*
Chinese Office Action dated Apr. 23, 2010 for Chinese Patent Application No. 200680045941.0, including English-language translation thereof.
Notice of rejection by Japanese Patent Examiner dated Oct. 11, 2011 and English translation thereof.

\* cited by examiner

*Primary Examiner* — Sophie Hon
(74) *Attorney, Agent, or Firm* — Holtz, Holtz, Goodman & Chick, PC

(57) ABSTRACT

An optical cellulose ester film comprising a cellulose ester (A); at least one ester based plasticizer (B) selected from ester based plasticizers composed of a polyhydric alcohol and a univalent carboxylic acid, or ester based plasticizers composed of a polyvalent carboxylic acid and a monohydric alcohol; at least one stabilizer (C) selected from the group consisting of a phenol based stabilizer, a hindered amine based stabilizer, or a phosphorous based stabilizer; and a hydrogen bonding solvent (D).

5 Claims, No Drawings

OPTICAL CELLULOSE ESTER FILM AND MANUFACTURING METHOD THEREOF, AND POLARIZING PLATE AND LIQUID CRYSTAL DISPLAY DEVICE

This application is the United States national phase application of International Application PCT/JP2006/322626 filed Nov. 14, 2006.

TECHNICAL FIELD

The present invention relates to an optical film incorporating cellulose ester film formed via a melt casting method, a polarizing plate employing the aforesaid optical film as a polarizing plate protective film, and a liquid crystal display employing the aforesaid polarizing plate.

BACKGROUND

Cellulose ester films are employed as a transparent resin film (hereinafter also referred to simply as a film) which is employed as a polarizing plate protective film employed in liquid crystal displays. Since cellulose ester films are optically and physically beneficial as a polarizing plate protective film, they are commonly most widely employed.

Heretofore, cellulose ester films have been prepared in such a manner that dope is prepared by dissolving cellulose ester in halogen based solvents such as dichloromethane, and the resulting dope is cast from a casting die onto a casting support such as a drum or a belt (being a solution casting film production method). Conventionally, dichloromethane has been employed as a suitably solvent of cellulose ester films due to its advantage of being readily dried because of its relatively low boiling point (a boiling point of approximately 40° C.).

However, in view of recent environment protection, it is required that halogen based solvents such as dichloromethane are handled in sealed facilities. For example, countermeasures are to be taken which include a method in which leakage of halogen based solvents is prevented via an extensive closed system and even though the leakage would have occurred, any leaked halogen based solvents are adsorbed in the gas absorbing tower prior to discharge to the exterior. Further, methods are also employed in which, prior to discharge to the exterior, halogen based solvents are burned via heating, or decomposed via electron beams.

As mentioned above, the industrial solution casting film production method has resulted in a significant environmental load as well as the cost for solvent recovery. Consequently, various solvents other than halogen based solvents have been investigated, but no other solvents, which dissolve cellulose esters as targeted, have yet been discovered.

As a method to prevent the discharge of halogenated solvents to the atmosphere or to lower the solvent drying load of the solution casting film production method, Patent Document 1 discloses a polyester film production method based on a melt casting method using no solvents.

In the above film production method, easier melt film production is realized by lowering the melting point of cellulose esters by lengthening the carbon chain of the ester group. Specifically, melt film production is enabled by employing, as cellulose esters, those which are highly substituted with a propionate group and a butyrate group, each of which has a longer chain than an acetate group.

However, cellulose ester films prepared via the above method have resulted in drawbacks such as a decrease in mechanical strength and degradation of saponification properties due to high substitution with a propionate group or a butyrate group, each of which has a longer chain than an acetate group. When the cellulose ester film which suffers from such depredated characteristics is employed, during preparation of polarizing plates, close adhesion to polarizing plates degrades. Further, when employed upon being mounted on liquid crystal display devices, viewing field characteristics are markedly degraded due to changes in temperature and humidity, wherefore further improvements have been demanded.

Patent Document 1: Unexamined Japanese Patent Application Publication No. (hereinafter referred to as JP-A) 2005-178194

DISCLOSURE OF THE INVENTION

Problems to be Solved by the Present Invention

In view of the foregoing, the present invention was achieved. An object of the present invention is to provide an optical film whose melt viscosity can be lowered irrespective of the type of cellulose ester, and which exhibits a low melting temperature, results in minimal thermal degradation forming materials, and excels in mechanical and optical characteristics, dimensional stability and melt formability, and a manufacturing method thereof, as well as a polarizing plate and a liquid crystal display device, employing the aforesaid optical film.

Means to Solve the Problems

The above problems of the present invention were solved via the following embodiments.

Item 1. An optical cellulose ester film comprising a cellulose ester (A); at least one ester based plasticizer (B) selected from ester based plasticizers composed of a polyhydric alcohol and a univalent carboxylic acid, or ester based plasticizers composed of a polyvalent carboxylic acid and a monohydric alcohol; at least one stabilizer (C) selected from the group consisting of a phenol based stabilizer, a hindered amine based stabilizer, and a phosphorous based stabilizer; and a hydrogen bonding solvent (D).

Item 2. The optical cellulose ester film, described in Item 1 above,
wherein an amount of the hydrogen bonding solvent (D) is 0.005-2.0 parts by weight with respect to 100 parts by weight of the cellulose ester in the optical cellulose ester film.

Item 3. A manufacturing method of an optical cellulose ester film comprising a step of:
melt-casting a composition incorporated a cellulose ester (A); at least one ester based plasticizer (B) selected from ester based plasticizers composed of polyhydric alcohol and univalent carboxylic acid, or ester based plasticizers composed of polyvalent carboxylic acid and monohydric alcohol; at least one stabilizer (C) selected from the group consisting of a phenol based stabilizer, a hindered amine based stabilizer and a phosphorous based stabilizer; and a hydrogen bonding solvent (D),
wherein the composition incorporates the hydrogen bonding solvent (D) in an amount of 0.1-5 parts by weight with respect to 100 parts by weight of the cellulose ester; and the optical cellulose ester film incorporates the hydrogen bonding solvent (D) in an amount of 0.005-2.0 parts by weight with respect to 100 parts by weight of the cellulose ester.

Item 4. A polarizing plate employing the optical cellulose ester film described in Item 1 or 2 above.

Item 5. A liquid crystal display device employing the polarizing plate described in Item 4 above.

EFFECTS OF THE INVENTION

According to the present invention, it is possible to provide an optical film whose melt viscosity can be lowered irrespective of the type of cellulose esters, and which exhibits a low melting temperature, results in minimal thermal degradation of forming materials and excels in mechanical and optical characteristics, dimensional stability and melt formability, and a manufacturing method thereof, as well as a polarizing plate and a liquid crystal display device, employing the aforesaid optical film.

DETAILED DESCRIPTION OF THE INVENTION

In the solution casting method which is one of the methods to prepare cellulose ester films, film is produced by casting a solution prepared via dissolution in solvents, followed by drying via evaporation of solvents. In this method, since solvents which remain in the interior of the film, should be removed, facility investments for manufacturing lines such as a drying line, drying energy, as well as recovery and regeneration facilities becomes enormous and production cost becomes excessively high. Consequently, these curtailments have become big challenges.

On the contrary, in film production via the melt casting method, since no solvents to prepare a cellulose ester solution are employed, neither the above drying nor facilities load results.

The inventors of the present invention conducted diligent investigations. As a result, it was discovered that by employing an optical cellulose ester film which incorporated cellulose ester (A), at least one ester based plasticizer (B) selected from the ester based plasticizers composed of polyhydric alcohol and univalent carboxylic acid, or the ester based plasticizers composed of polyvalent carboxylic acid and monohydric alcohol, at least one stabilizer (C) selected from phenol based stabilizers, hindered amine based stabilizers or phosphorous based stabilizers, and a hydrogen bonding solvent (D), it became possible to prepare an optical film whose melt viscosity was allowed to be lowered irrespective of the type of cellulose esters, and which exhibited a low melting temperature, resulted in minimal thermal degradation of forming materials and excelled in mechanical and optical characteristics, dimensional stability, and molten formability.

Optical film, as described in the present invention, refers to the functional film employed in various display devices such as a liquid crystal display, a plasma display, or an organic EL display, and specifically includes an optical compensation film such as a polarizing plate protective film, a retardation film, an antireflective film, a luminance enhancing film, or a viewing angle enlarging film.

The present invention will now be detailed.
(Melt Casting Method)

The optical cellulose ester film (hereinafter also referred simply to as the optical film) of the present invention is characterized as a cellulose ester film formed via a melt casting method. The melt casting method in the present invention is defined in such a manner that cellulose ester is thermally melted to the temperature which exhibits fluidity and subsequently, the fluid cellulose ester is cast.

Heat-melt molding methods are, in more detail, divided into a melt-extrusion molding method, a press molding method, an inflation method, an ejection molding method, a blow molding method, and a stretch molding method. Of these, in order to prepare optical films which excel in mechanical strength and surface accuracy, the melt extrusion method is superior. In this method, a composition is heated, and after generation of its fluidity, film is produced via extrusion onto a drum or a looped belt.

(Cellulose Ester)

Cellulose esters employed in the present invention include each of the cellulose esters substituted with a substituted or unsubstituted aromatic acyl group or aliphatic acyl group, or mixed acid esters.

Of the aromatic acyl groups, when the aromatic ring is a benzene ring, examples of substituents of the benzene ring include a halogen atom, a cyano group, an alkyl group, an alkoxy group, an aryl group, an aryloxy group, an acyl group, a carboamido group, a sulfonamido group, a ureido group, an aralkyl group, a nitro group, an alkoxycarbonyl group, an aryloxycarbonyl group, an aralkyloxycarbonyl group, a carbamoyl group, a sulfamoyl group, an acyloxy group, an alkenyl group, an alkynyl group, an alkylsulfonyl group, an arylsulfonyl group, an alkyloxysulfonyl group, an aryloxysulfonyl group, an alkylsulfonyloxy group, an aryloxysulfonyl group, —S—R, —NH—CO—OR, —PH—R, —P(—R)$_2$, —PH—O—R, —P(—R) (—O—R), —P(—O—R)$_2$, —PH(=O)—R—P(=O) (—R)$_2$, —PH(=O)—O—R, —P(=O)(—R)(—O—R), —P(=O)(—O—R)$_2$, —O—PH(=O)—R, —O—P(=O)(—R)$_2$—O—PH(=O)—O—R, —O—P(=O) (—R) (—O—R), —O—P(=O) (—O—R)$_2$, —NH—PH(=O)—R, —NH—P(=O) (—R) (—O—R), —NH—P(=O) (—O—R)$_2$, —SiH$_2$—R, —SiH(—R)$_2$, —Si (—R)$_3$, —O—SiH$_2$—R, —O—SiH(—R)$_2$, and —O—Si(—R)$_3$. Above R is an aliphatic group, an aromatic group, or a heterocyclyl group. The number of the substituents is preferably 1-5, is more preferably 1-4, is further more preferably 1-3, but is most preferably 1-2. As the substituents, preferred are the halogen atom, the cyano group, the alkyl group, the alkoxy group, the aryl group, the aryloxy group, the acyl group, the carboamido group, the sulfonamido group and the ureido group; more preferred are the halogen atom, the cyano group, the alkyl group, the alkoxy group, the aryloxy group, the acyl group, and the carboamido group; more preferred are the halogen atom, the cyano group, the alkyl group, the alkoxy group, and the aryloxy group; but most preferred are the halogen atom, the alkyl group, and the alkoxy group.

The above halogen atom includes a fluorine atom, a chlorine atom, a bromine atom, and an iodine atom. The above alkyl group may have a ring structure or a branch. The number of carbon atoms of the alkyl group is preferably 1-20, is more preferably 1-12, is further preferably 1-6, but is most preferably 1-4. Examples of the alkyl group include methyl, ethyl, propyl, isopropyl, butyl, t-butyl, hexyl, cyclohexyl, octyl, and 2-ethylhexyl. The above alkoxy group may have a ring structure or a branch. The number of carbon atoms of the alkoxy group is preferably 1-20, is more preferably 1-12, is further preferably 1-6, but is most preferably 1-4. The alkoxy group may be substituted with another alkoxy group. Examples of the alkoxy group include methoxy, ethoxy, 2-methxyethoxy, 2-methoxy-2-ethoxy, butyloxy, hexyloxy, and octyloxy.

The number of carbon atoms of the above aryl group is preferably 6-20, but is more preferably 6-12. Examples of the aryl group include phenyl and naphthyl. The number of carbon atoms of the above aryloxy group is preferably 6-20, but is more preferably 6-12. Examples of the aryloxy group include phenoxy and naphthoxy. The number of carbon atoms of the above acyl group is preferably 1-20, but is more preferably 1-12. Examples of the acyl group include formyl, acetyl, and benzoyl. The number of carbon atoms of the above carboamido group is preferably 1-20, but is more preferably 1-12. Examples of the carboamido group include acetoamido and benzamido. The number of carbon atoms of the above sulfoamido group is preferably 1-20, but is more preferably 1-12. Examples of the sulfoamido group include methanesulfonamido; benzenesulfoamido, and p-toluenesulfoamido.

The number of carbon atoms of the above ureido group is preferably 1-20, but is more preferably 1-12. Examples of the ureido group include substituted or unsubstituted ureido.

The number of carbon atoms of the above aralkyl group is preferably 7-20, but is more preferably 7-12. Examples of the aralkyl group include benzyl, phenetyl, and naphthylmethyl. The number of carbon atoms of the above alkoxycarbonyl group is preferably 1-20, but is more preferably 2-12. Examples of the alkoxycarbonyl group include methoxycarbonyl. The number of carbon atoms of the above aryloxycarbonyl group is preferably 7-20, but is more preferably 7-12. Examples of the aryloxycarbonyl group include phenoxycarbonyl. The number of carbon atoms of the above araloxycarbonyl group is preferably 8-20, but is more preferably 8-12. Examples of the araloxycarbonyl group include benzyloxycarbonyl. The number of carbon atoms of the above arylcarbamoyl group is preferably 1-20, but is more preferably 1-12. Examples of the carbamoyl group include substituted or unsubstituted carbamoyl and N-methylcarbamoyl. The number of carbon atoms of the above sulfamoyl is preferably at most 20, but is more preferably at most 12. Examples of the sulfamoyl group include substituted or unsubstituted sulfamoyl and N-methylsulfamoyl. The number of carbon atoms of the above acyloxy group is preferably 1-20, but is more preferably 2-12. Examples of the acyloxy group include acetoxy and benzoyloxy.

The number of carbon atoms of the above alkenyl group is preferably 2-20, but is more preferably 2-12. Examples of the alkenyl group include vinyl, allyl, and isopropenyl. The number of carbon atoms of the above alkynyl group is preferably 2-20, but is more preferably 2-12. Examples of the alkynyl group include thienyl. The number of carbon atoms of the above alkylsulfonyl group is preferably 1-20, but is more preferably 1-12. The number of carbon atoms of the above arylsulfonyl group is preferably 6-20, but is more preferably 6-12. The number of carbon atoms of the above alkyloxysulfonyl group is preferably 1-20, but is more preferably 1-12. The number of carbon atoms of the above aryloxysulfonyl group is preferably 6-20, but is more preferably 6-12. The number of carbon atoms of the above alkylsulfonyloxy group is preferably 1-20, but is more preferably 1-12.

In cellulose esters employed in the present invention, when the hydrogen atom of the hydroxyl group portion is in the aliphatic ester with an aliphatic acyl group, the above aliphatic acyl group has 2-20 carbon atoms and the specific examples include acetyl, propionyl, butylyl, isobutyl, varelyl, pivaloyl, hexanoyl, octanoyl, lauroyl, and stearoyl. Above aliphatic acyl groups, as described in the present invention, refer to those having a substituent. As the substituent, when the aromatic ring is a benzene ring in the above aromatic acyl group, listed are those exemplified as the substituent of the benzene ring. Further, when the esterified substituent of the above cellulose ester is an aromatic ring, the number of the substituents substituted to the aromatic ring is commonly 0 or 1-5, is preferably 1-3, but more preferably 1 or 2. Further, the number of substituents which are substituted to the aromatic ring is at least 2, they may be the same or different, and may link with each other to form a condensed polycyclic compound (for example, naphthalene, indene, indan, phenanthrene, quinoline, isoquinoline, coumarone, phthalazine, acridine, indole, and indoline).

It is preferable that cellulose esters employed in the present invention are substituted with either a substituted or unsubstituted aliphatic acyl group, or a substituted or unsubstituted aromatic acyl group. These may be esters prepared by a single acid or a mixture of acids. Further, it may be possible to employ a mixture of at least two cellulose esters.

Cellulose ester employed in the present invention is preferably at least one selected from cellulose acetate, cellulose propionate, cellulose butyrate, cellulose acetate phthalate, and cellulose phthalate.

Of these, specifically preferred cellulose esters include cellulose acetate, cellulose propionate, cellulose butyrate, cellulose acetate propionate, and cellulose acetate butyrate.

More preferable lower fatty acid esters including cellulose acetate and cellulose acetate butyrate have an acyl group having 2-4 carbon atoms as a substituent and simultaneously satisfy following Formulas (I) and (II):

$$2.5 \leq X+Y \leq 2.9$$ Formula (I)

$$0.1 \leq x \leq 2.0$$ Formula (II)

wherein X is the degree of substitution by an acetyl group, while Y is the degree of substitution by a propionyl or butyrate group.

Of these, preferably and particularly employed is cellulose acetate propionate which satisfies the relationships of $1.0 \leq X \leq 2.5$ and $0.5 \leq Y \leq 2.5$. The portion which is not substituted with an acyl group commonly exists as a hydroxyl group. It is possible to synthesize these via any of the conventional methods.

Further, the ratio of weight average molecular weight Mw/number average molecular weight Mn of the cellulose esters employed in the present invention is preferably 1.5-5.5, is more preferably 2.0-4.5, is still more preferably 2.3-4.0, but is most preferably 2.5-3.5.

Raw material cellulose for the cellulose esters employed in the present invention may be either wood pulp or cotton linter. The wood pulp may be prepared employing coniferous trees or broad-leaved trees, but one prepared by employing the coniferous trees is more preferred. In view of peeling properties during film production, cotton linter is preferably employed. Cellulose esters which have been prepared employing the above may be employed individually, or appropriately blended. For example, it is possible to employ a mixture of cellulose ester derived from cotton linter, cellulose ester derived from wood pulp (coniferous tress), and cellulose ester derived from wood pulp (broad-leaved trees) at the respective ratios of 100:0:0, 90:10:0, 85:15:0, 50:50:0, 20:80:0, 10:90:0, 0:100:0, 0:0:100, 80:10:10, 85:0:15, or 40:30:30.

(Hydrogen Bonding Solvents)

As described in J. N. Israelachivili, "Bunshikan Ryoku to Hyomen Ryoku (Intermolecular and Surface Forces) (translated by Tamotsu Kondo and Hiroyuki Oshima, MacGraw Shuppan, 1991), hydrogen bonding solvents in the present invention refer to organic solvents which are capable of resulting in "bonding" via a hydrogen atom, which is formed between an electrically negative atom (oxygen, nitrogen, fluorine, or chlorine) and a hydrogen atom which has formed a covalent bond with the above electrically negative atom, and namely refer to organic solvents which exhibit a relatively large bonding moment and incorporate any of the hydrogen-containing bonds such as O—H (an oxygen and hydrogen bond), N—H (a nitrogen hydrogen bond), or F—H (a fluorine hydrogen bond) so that molecules are capable of being arranged with each other.

These exhibit the capability to forms a stronger hydrogen bond with cellulose than the intermolecular hydrogen bond between the cellulose esters. Consequently, in the melt casting method performed in the present invention, by the addition of hydrogen bond forming solvents, it is possible to realize a lower melting temperature of the resulting composition than the glass transition temperature of an individual cellulose ester. Further, at the same melting temperature, it is possible to realize a melt viscosity of the composition incorporating hydrogen bonding solvents which is lower than that of the corresponding cellulose ester.

Hydrogen bonding solvents include alcohols (for example, methanol, ethanol, propanol, isopropanol, n-butanol, sec-butanol, t-butanol, 2-ethylhexanol, heptanol, octanol, nanol, dodecanol, ethylene glycol, propylene glycol, hexylene glycol, dipropylene glycol, polyethylene glycol, polypropylene glycol, methyl cellosolve, ethyl cellosolve, butyl cellosolve, hexyl cellosolve, and glycerin); ketones (for example, acetone and methyl ethyl ketone); carboxylic acids (for example, formic acid, acetic acid, propionic acid, and lactic acid); ethers (for example, diethyl ether, tetrahydrofuran, and dioxane); pyrrolidones (for example, N-methylpyrrolidone); and amines (for example, trimethylamine and pyridine).

These hydrogen bonding solvents may be employed individually or in combinations of at least two types.

Of these, preferred are alcohols, ketones, and ethers, and preferred are methanol, ethanol, propanol, isopropanol, octanoyl, dodecanoyl, ethylene glycol, glycerin, acetone, or tetrahydrofuran. Further, specifically preferred are water-soluble solvents such as methanol, ethanol, propanol, isopropanol, ethylene glycol, glycerin, acetone, or tetrahydrofuran. "Water soluble", as described herein, means that solubility with respect to 100 g of water is at least 10 g.

In view of lowering viscosity during melting and of load to remove solvents during drying, the amount of hydrogen bonding solvents is preferably 0.1-5 parts by weight with respect to 100 parts by weight of the cellulose esters in composition composed of cellulose esters, additives, and hydrogen bonding solvents, while the amount of hydrogen bonding solvents is commonly at most 2 parts by weight with respect to 100 parts by weight of the optical cellulose ester film, but is preferably 0.005-2.0 parts by weight.

(Additives)

Additives employed in the present invention include plasticizers, antioxidants, acid scavengers, light stabilizers, peroxide decomposing agents, radical catchers, metal deactivating agents, UV absorbers, matting agents, dyes, and pigments. Further, additives which exhibit any function of the above additives are employed irrespective of the above classification.

Additives are employable to retard modification represented by coloring and a decrease in molecular weight, and formation of volatile components due to decomposition of materials, including prevention of oxidation of compositions, catching of a generated acid, and retardation or exhibition of decomposition reaction induced by a radical type group due to light or heat, including decomposition reactions which are not yet been fully understood.

On the other hand, when a composition is heat-melted, decomposition reactions are markedly accelerated, and occasionally, coloring, and a decrease in strength of the above composing materials due to a decrease in the molecular weight, result. Further, occasionally, due to decomposition reactions of the composition, generation of adverse volatile components results simultaneously. When the composition is heat-melted, the presence of the above additives is advantageous so that a decrease in strength due to degradation and decomposition of materials is retarded or it is possible to retain the inherent strength of the materials. In view of possibility of manufacture of the optical film of the present invention, it is essential that the above additives are present.

Further, the presence of the above additives excels in retardation of formation of colored materials in the visible region during heat-melting, and retardation or elimination of adverse performance as an optical film, such as a decrease in transmittance or an increase in the haze value via mixing of volatile components into the film.

In the present invention, when an optical film is employed under an embodiment of the present invention, displayed images of the liquid crystal devices are adversely affected via a haze value of at least 1%. Consequently, the haze value is preferably less than 1%, but is more preferably less than 0.5%.

During film production, in a process which results in retardation, the presence of the above additives is to retard degradation of strength of the above composition and to maintain the inherent strength of materials. When the composition become fragile due to significant degradation, breakage tends to occur in the aforesaid stretching process, whereby occasionally, it is not possible to control the retardation value.

During storage of the above composition or during the film production process, occasionally, degradation reactions due to ambient oxygen occur simultaneously. In such cases, in order to enable the present invention, it is possible to simultaneously utilize stabilizing actions via the above additives as well as a decrease in ambient oxygen concentration. As conventional technologies, listed are the use of inert gases such as nitrogen or argon, a degassing operation via reduced pressure-vacuum, and operations within a sealed environment. It is possible to simultaneously employ at least one of the above three methods with the method in which additives are allowed to exist. It is preferable that to achieve the targets of the present invention, probability of contact of the composition with ambient oxygen is lowered so that it is possible to retard deterioration of the above materials.

With regard to the optical film of the present invention, in view of the use as a polarizing plate protective film, and enhancement of storage stability of the polarizing plate, and the polarizer constituting the same, it is preferable that the above additives are incorporated in the composition.

In liquid crystal display devices employing the polarizing plate of the present invention, since the above additives are incorporated in the optical film of the present invention, in view of retardation of the above modification and degradation, it is possible to enhance storage stability of the optical film. With regard to enhancement of display quality of liquid crystal display devices, optical compensation design, provided within the optical film, exhibits its superior function over an extended period.

Additives will now be further detailed.

(Plasticizer)

The addition of compounds known as a plasticizer to the optical film of the present invention is preferable in view of modification of the film such as enhancement of mechanical properties, increased flexibility, increased water absorption resistance, or a decrease in moisture permeability. Further, in the melt casting method employed in the present invention, plasticizers are added so that the melting temperature of a composition is controlled to be lower than the glass transition temperature of an employed cellulose ester itself, or at the same heating temperature, the viscosity of a composition incorporating plasticizers is controlled to be lower than that of the employed cellulose ester.

"Melting temperature of a composition", as described in the present invention, refers to the temperature at which the above material exhibits fluidity via heating. When only a cellulose ester is employed, it exhibits no fluidity for producing film at a temperature equal to or lower than the glass transition temperature. However, at a temperature equal to or higher than the glass transition temperature, the cellulose ester results in a decrease in elastic modulus or viscosity due to absorption of heat to exhibit fluidity. In order to melt a composition, it is preferable that the added plasticizer exhibits a melting point or a glass transition temperature, either of which is lower than the glass transition temperature of the cellulose ester.

In the present invention, preferred are polyhydric alcohol ester based plasticizers, having a structure in which the organic acid represented by following Formula (1) and a polyhydric alcohol are condensed. The polyhydric alcohol ester based plasticizers having a structure, in which the organic acid represented by following Formula (1) and a polyhydric alcohol are condensed, lower the melting temperature of cellulose esters, whereby the resulting cellulose esters exhibit process suitability due to low volatility during the melt film production process and after the production, and the resulting cellulose ester film excels in optical characteristics, dimensional stability, and flatness.

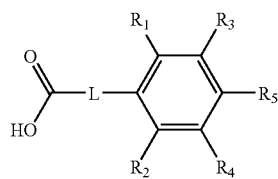

Formula (1)

wherein $R_1$-$R_5$ each represents a hydrogen atom, a cycloalkyl group, an aralkyl group, an alkoxy group, a cycloalkoxy group, an aryloxy group, an aralkyloxy group, an acyl group, a carbonyloxy group, an oxycarbonyl group, and an oxycarbonyloxy group; each of these may further have a substituent; of $R_1$-$R_5$, at least one is not a hydrogen atom; L represents a divalent linking group which includes a substituted or unsubstituted alkylene group, an oxygen atom, or a direct bond.

As the cycloalkyl group represented by $R_1$-$R_5$, also preferred is a cycloalkyl group having 3-8 carbon atoms, and specific examples thereof include groups such as cyclopropyl, cyclopentyl, and cyclohexyl. These groups may be substituted, and preferred substituents include a halogen atom such as a chlorine atom, a bromine atom, or a fluorine atom, a hydroxyl group, an alkyl group, an alkoxy group, an aralkyl group (this phenyl group may further be substituted with an alkyl group or a halogen atom), a vinyl group, an alkenyl group such as an aryl group, a phenyl group (this phenyl group may further be substituted with an alkyl group or a halogen atom), a phenoxy group (this phenyl group may further be substituted with an alkyl group or a halogen atom), an acetyl group, an acyl group having 2-8 carbon atoms such as a propionyl group), and an unsubstituted carbonyloxy group having 2-8 carbon atoms such as an acetyloxy group or a propionyloxy group.

The aralkyl group represented by $R_1$-$R_5$ includes a benzyl group, a phenetyl group, a γ-phenylpropyl group, and these groups may be substituted. Also listed as preferred substituents may be groups, which may be substituted for the above cycloalkyl group.

The alkoxy group represented by $R_1$-$R_5$ includes alkoxy groups having 1-8 carbon atoms, and specific examples thereof include alkoxy groups such as methoxy, ethoxy, n-propoxy, n-butoxy, n-octyloxy, isopropoxy, isobutoxy, 2-ethylhexyloxy, or t-butoxy. These groups may further be substituted, and preferred substituents include a halogen atom such as a chlorine atom, a bromine atom, or a fluorine atom, a hydroxyl group, an alkoxy group, an aralkyl group (this phenyl group may be substituted with an alkyl group or a halogen atom), an alkenyl group, a phenyl group (this phenyl group may further be substituted with an alkyl group and a halogen atom), an aryloxy group (for example, a phenoxy group (this phenyl group may further be substituted with an alkyl group or a halogen atom)), an acetyl group, an acyl group such as an acetyl group or a propionyl group, an acyloxy group having 2-8 carbon atoms such as an acetyloxy group or propionyloxy group), and a arylcarbonyloxy group such as a benzoyloxy group.

The cycloalkoxy group represented by $R_1$-$R_5$ includes, as an unsubstituted cycloalkoxy group, cycloalkoxy groups having 1-8 carbon atoms, and specific examples thereof include groups such as cyclopropyloxy, cyclopentyloxy, or cyclohexyloxy. These groups may be substituted, and preferred substituents include the same groups which may be substituted to the above cycloalkyl groups.

The aryloxy group represented by $R_1$-$R_5$ includes a phenoxy group which may be substituted with a substituent, such as an alkyl group or a halogen atom, which is listed as a substituent which may be substituted to the above cycloalkyl group.

The aralkyloxy group represented by $R_1$-$R_5$ includes a benzyl group and a phenetyloxy group, which may be further substituted. As a preferred substituent, also listed may be substituents which may be substituted for the above cycloalkyl group.

The acyl group represented by $R_1$-$R_5$ includes an unsubstituted acyl group (included as the hydrocarbon group of the acyl group are alkyl, alkenyl, and alkynyl groups), having 2-8 carbon atoms such as an acetyl group or a propionyl group. These substituents may further be substituted. As the preferred substituent, also listed may be substituents which may be substituted for the above cycloalkyl group.

The carbonyloxy group represented by $R_1$-$R_5$ includes unsubstituted acyloxy groups (included as the hydrocarbon group of the acyl group are alkyl, alkenyl, and alkynyl groups), having 2-8 carbon atoms, such as an acetyloxy group or a propionyloxy group. Further listed are arylcarbonyloxy groups such as a benzoyloxy group. These substituents may further be substituted with the same groups as those which may be substituted for the above cycloalkyl group.

The oxycarbonyl group represented by $R_1$-$R_5$ includes alkoxycarbonyl groups such as a methoxycarbonyl group or an ethoxycarbonyl group, or aryloxycarbonyl groups such as a phenoxycarbonyl group. These substituents may further be substituted, and listed as a preferred substituent may be the same groups as those which may be substituted for the above cycloalkyl group.

The oxycarbonyloxy group represented by $R_1$-$R_5$ includes alkoxycarbonyloxy groups having 1-8 carbon atoms such as a methoxycarbonyl group. These substituents may further be substituted, and listed as a preferred substituent may be the same groups as those which may be substituted for the above cycloalkyl group.

Further, of $R_1$-$R_5$, at least one is not a hydrogen atom, and any two may be joined together to form a ring structure.

Further, the linking group represented by L includes a substituted or unsubstituted alkylene group, a hydrogen atom, and a direct bond. The alkylene group includes a methylene group, an ethylene group, and a propylene group, and these groups may be substituted with a group which is listed as one which may be substituted for the group represented by above $R_1$-$R_5$.

Of these, the specifically preferred linking group represented by L includes a direct bond and an aromatic carboxylic acid.

Further, these constitute esterified compounds which are employed as a plasticizer in the present invention. Preferred as the organic acid represented by above Formula (1) are those which have the above alkoxy group, acyl group, oxycarbonyl group, carbonyloxy group or oxycarbonyloxy group in $R_1$ or $R_2$. Further preferred are compounds having a plurality of substituents.

In the present invention, organic acids which are substituted for the hydroxyl group of tri- to higher-hydric alcohol may be either a single type or a plural type.

In the present invention, preferred as tri- or higher-hydric alcohol compounds which react with the organic acid represented by above Formula (1) to form polyhydric alcohol ester compounds are polyhydric alcohols of tri- to icosa-valent aliphatic polyhydric alcohol. In the present invention, preferred as tri- to higher-hydric alcohols are those represented by following Formula (3).

$$R'—(OH)_m \quad \text{Formula (3)}$$

wherein R' represents an m valent organic acid, m represents an integer of at least 3, and OH represents an alcoholic hydroxyl group. Specifically preferred are polyhydric alcohols having m of 3 or 4.

Examples of preferred polyhydric alcohols include, but are not limited to, adonitol, arabitol, 1,2,4-butanetriol, 1,2,3-hexanetriol, 1,2,6-hexanetriol, glycerin, diglycerin, erythritol, pentaerythritol, dipentaerythritol, tripentaerythritol, galactitol, glucose, cellobiose, inositol, mannitol, 3-methylpentane, 1,3,5-triol, pinacol, sorbitol, trimethylolpropane, trimethylolethane, trimethylolpropane, and pentaerythritol. Of these, particularly preferred are glycerin, trimethylolethane, trimethylolpropane, and pentaerythritol.

Esters of the organic acid represented by Formula (1) and tri- to higher-hydric alcohol can be synthesized via methods known in the art. In examples are shown representative synthetic examples. Examples of available methods include a method in which the organic acid represented by Formula (1) and polyhydric alcohol undergo esterification via condensation in the presence of acids, a method in which organic acid is previously modified to acid chloride or acid anhydride followed by the reaction with polyhydric alcohol, and a method in which organic acid phenyl ester is allowed to react with polyhydric alcohol. It is preferable to appropriately choose any of the methods depending on the targeted compound to result in a higher yield.

As plasticizers composed of the organic acid represented by Formula (1) and tri- to higher-hydric alcohol, preferred are the compounds represented by following Formula (2).

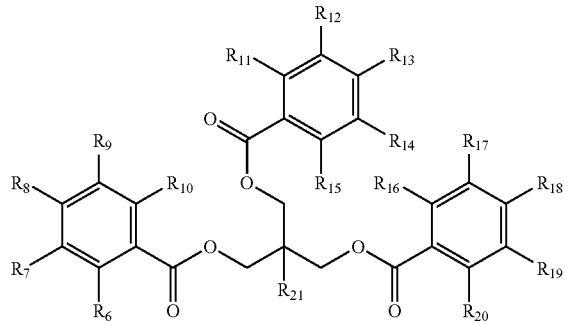

Formula (2)

In above Formula (2), $R_6$-$R_{20}$ each represents a hydrogen atom, an aralkyl group, an alkoxy group, a cycloalkoxy group, an aryloxy group, an aralkyloxy group, an acyl group, a carbonyloxy group, an oxycarbonyl group, an oxycarbonyloxy group, and these may further have a substituent. Of $R_6$-$R_{10}$, at least any one of these is not a hydrogen atom; of $R_{11}$-$R_{15}$, at least one of these is not a hydrogen atom; and of $R_{16}$-$R_{20}$, at least one of these is not a hydrogen atom. Further, $R_{21}$ represents an alkyl group.

As the cycloalkyl group, the aralkyl group, the alkoxy group, the cycloalkoxy group, the aryloxy group, the aralkyloxy group, the acyl group, the carbonyloxy group, the oxycarbonyl group, and the oxycarbonyloxy group represented by $R_6$-$R_{21}$, listed are the same groups represented by above $R_1$-$R_5$.

The molecular weight of the polyhydric alcohol esters, prepared as above, is not particularly limited, and is preferably 300-1,500, but is more preferably 400-1,000. The higher molecular weight is advantageous to reduce volatility, while the lower molecular weight is advantageous for water permeability and compatibility with cellulose esters.

Specific compounds of polyhydric alcohol esters according to the present invention will now be exemplified.

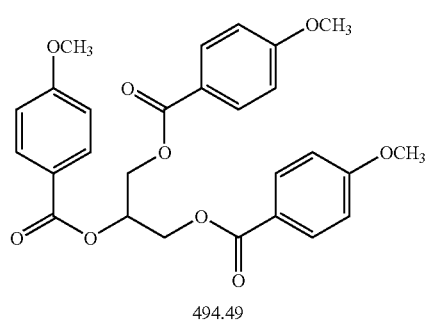

494.49

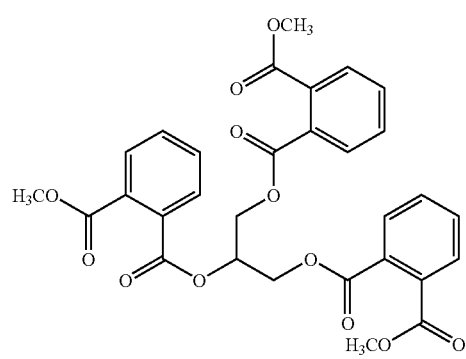

578.52

-continued
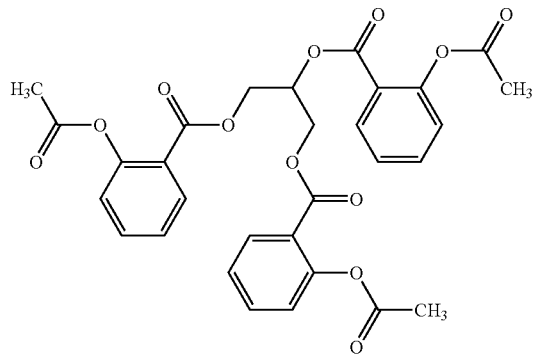
3
578.52
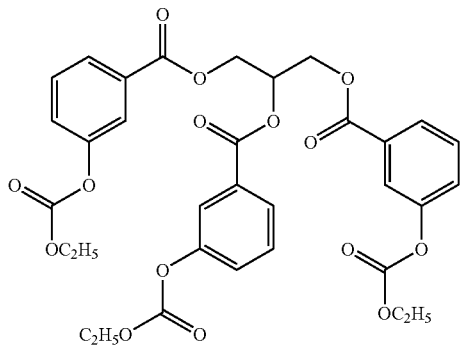
4
668.60
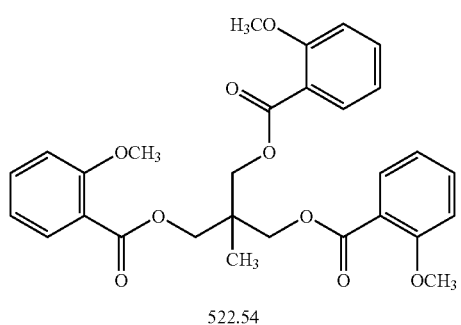
5
522.54
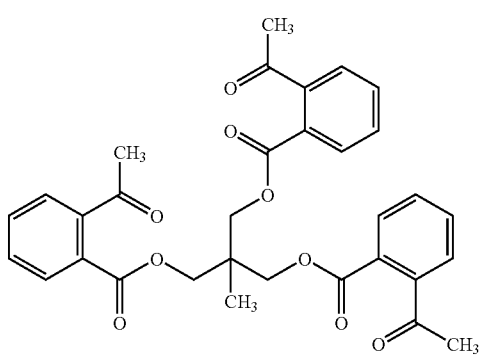
6
558.58
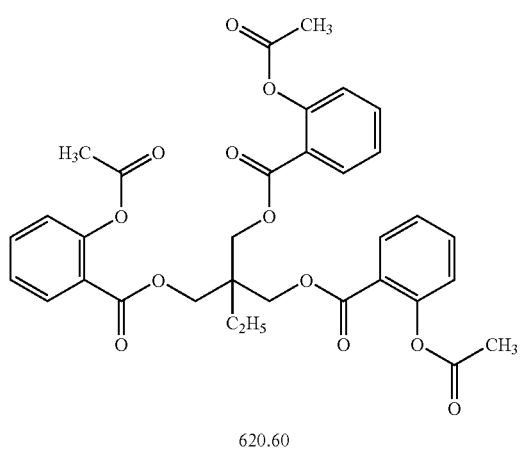
7
620.60
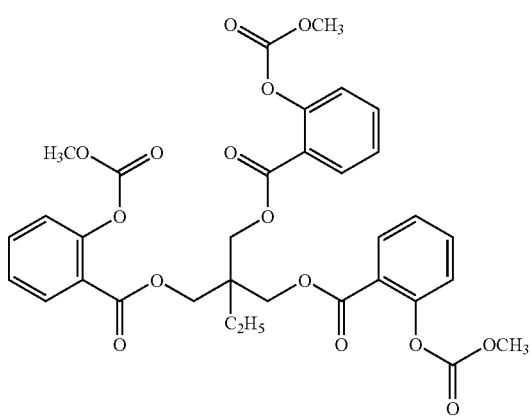
8
668.60
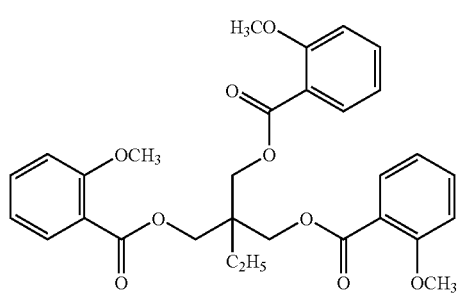
9
536.57
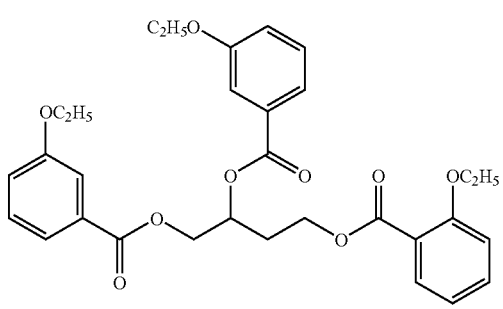
10
550.60

-continued
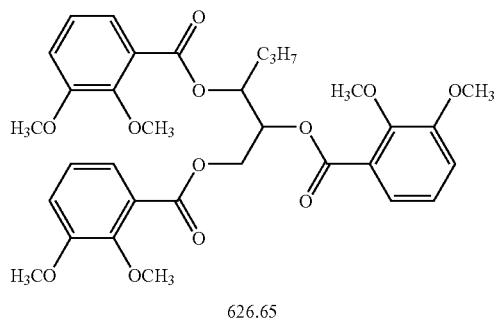
626.65
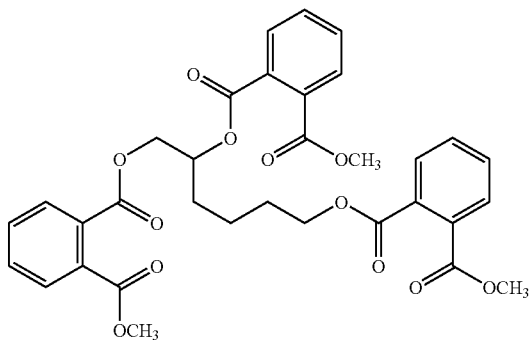
11
620.60
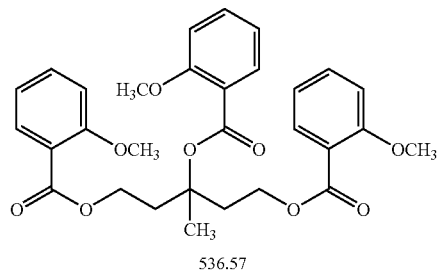
13
536.57
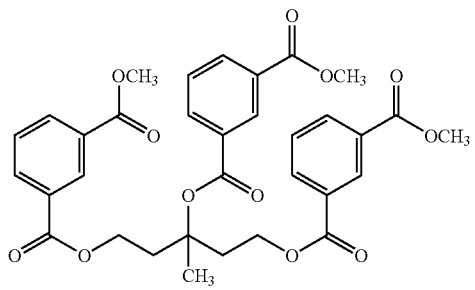
14
620.60
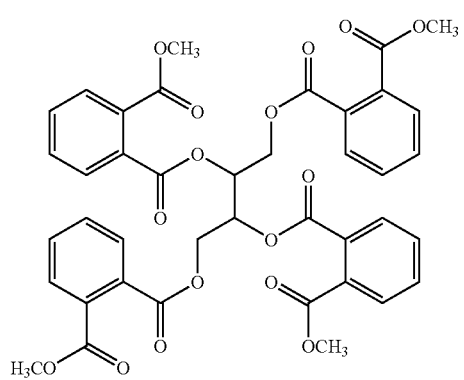
15
770.69
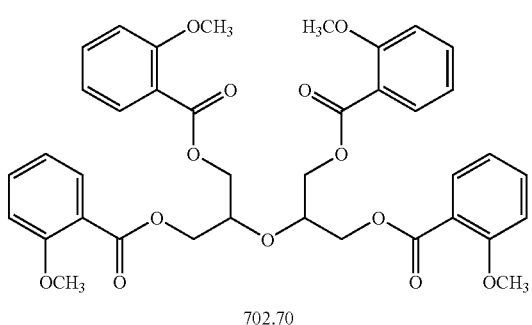
16
702.70
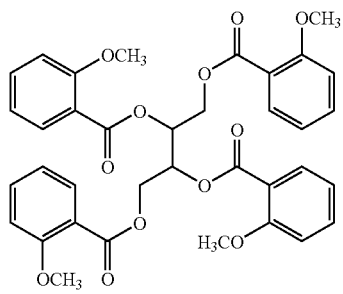
658.65
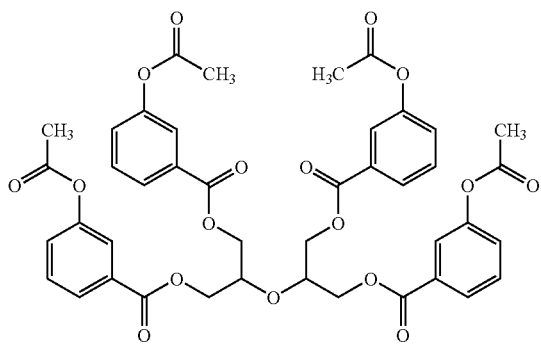
17
18
814.74

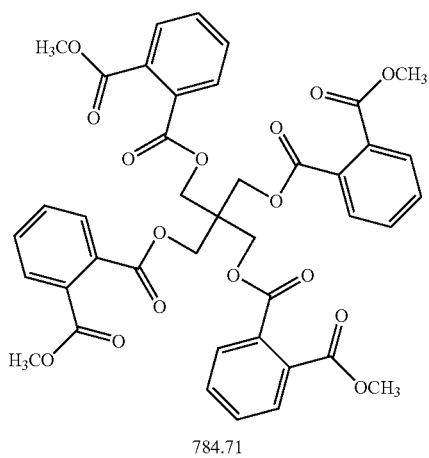
19
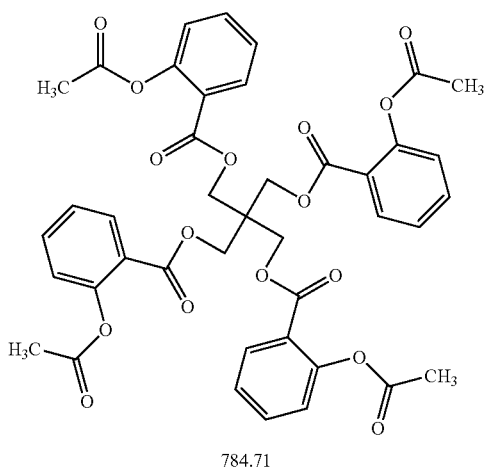
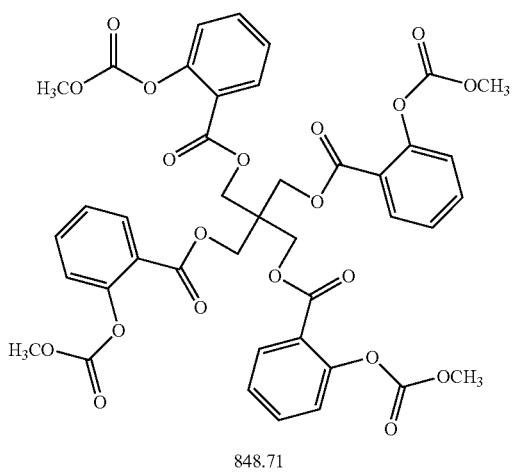
21
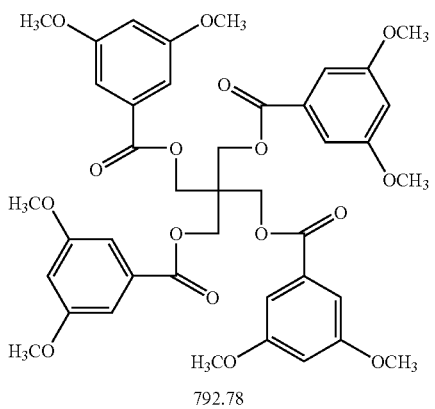
23
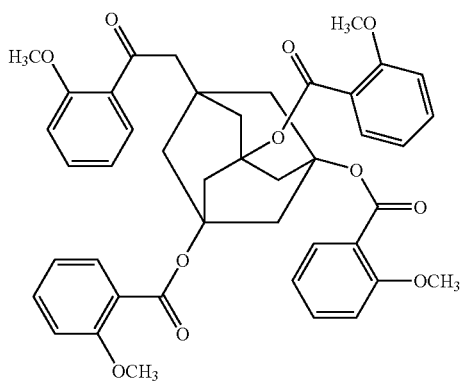
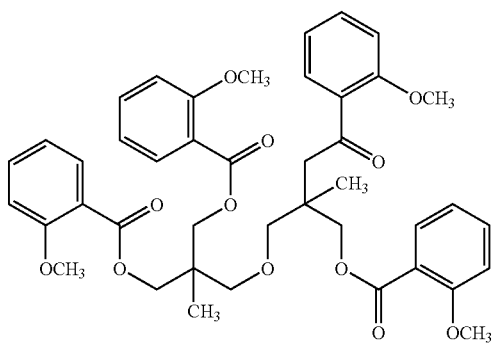

25
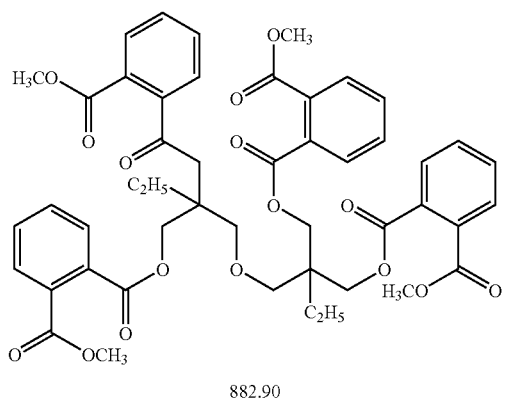
882.90
26
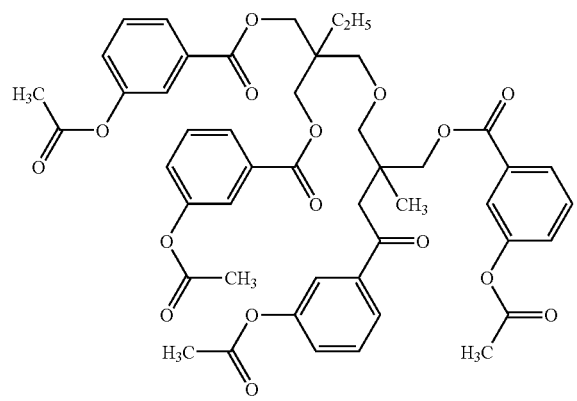
868.87
27
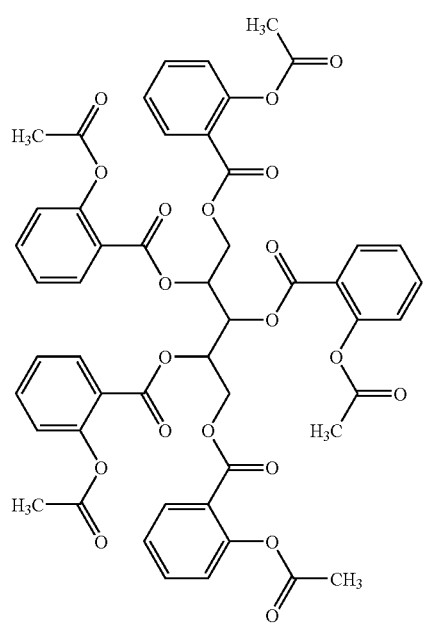
962.86
28
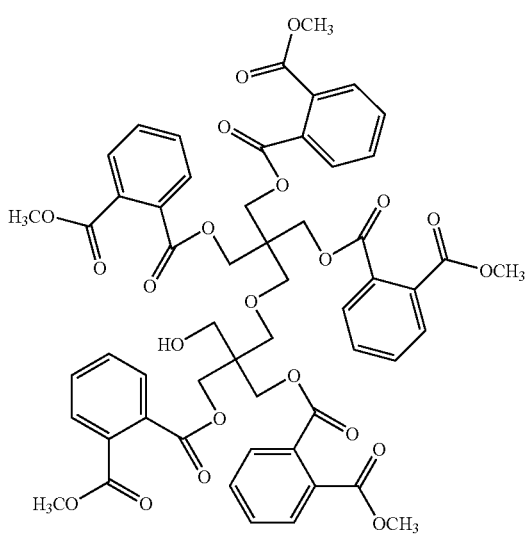
1064.99

-continued
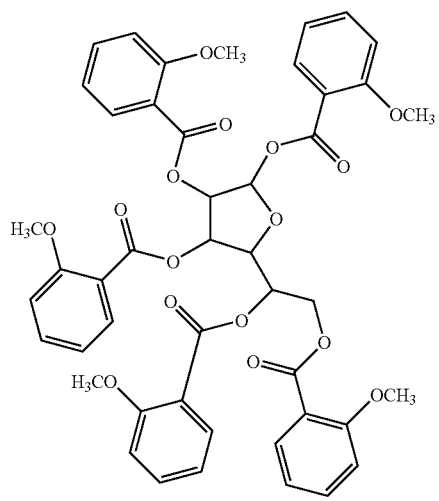
29
850.82
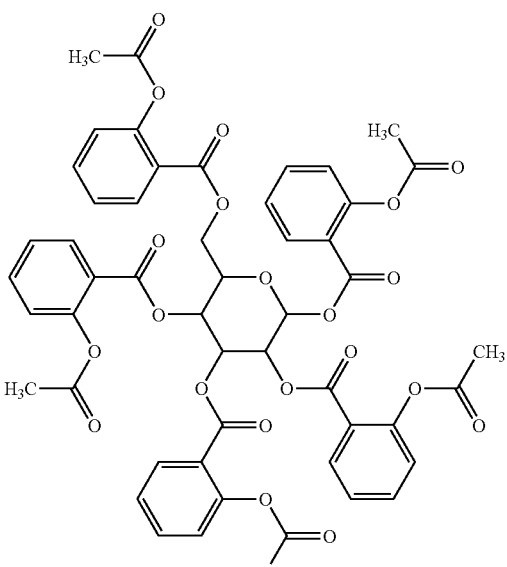
30
990.87
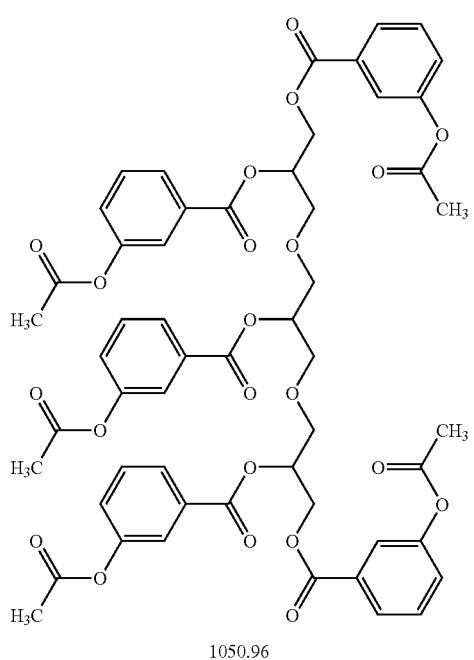
31
1050.96
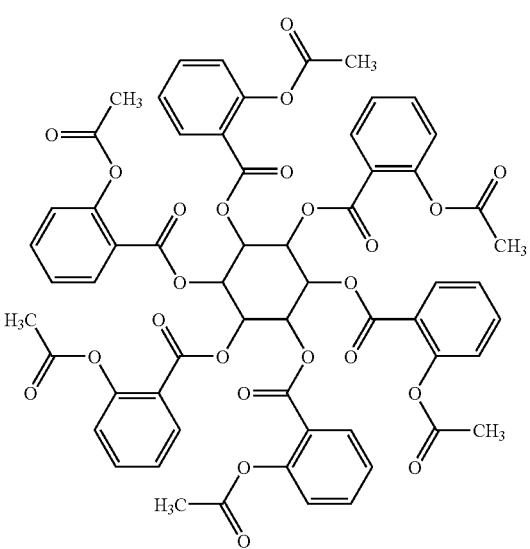
32
1153.01

-continued
33
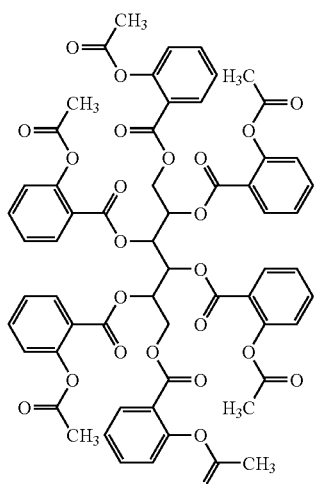
1155.02
34
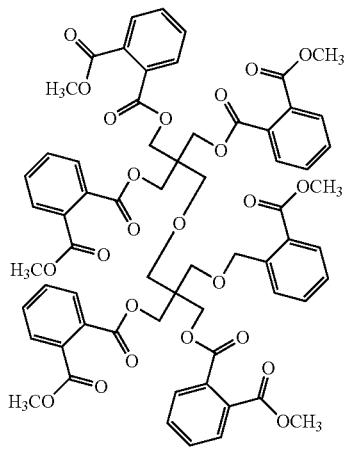
1213.15
35
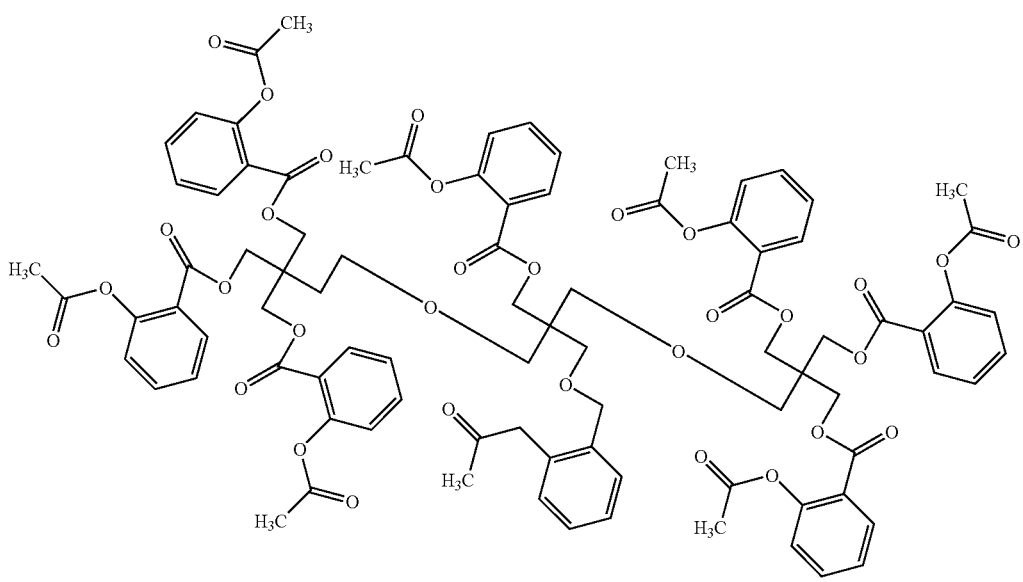
1669.59
36
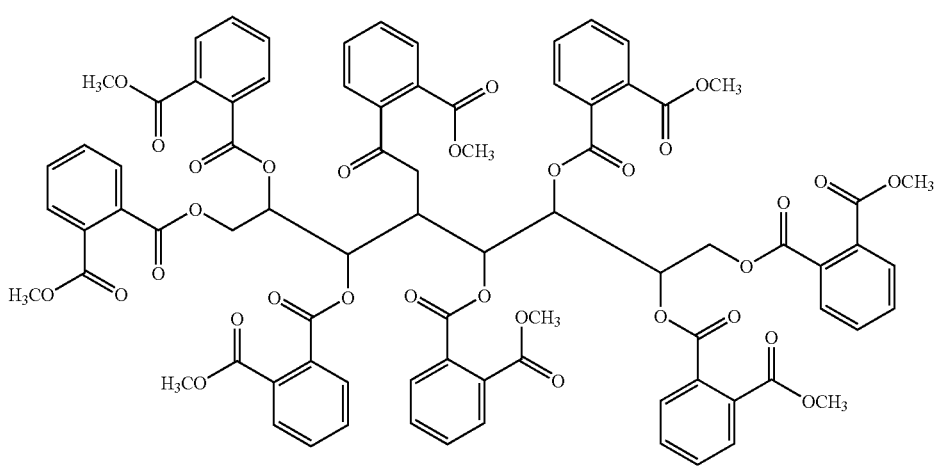
1539.36

-continued
37
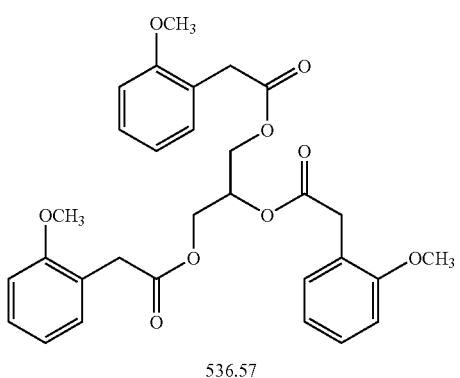
536.57
38
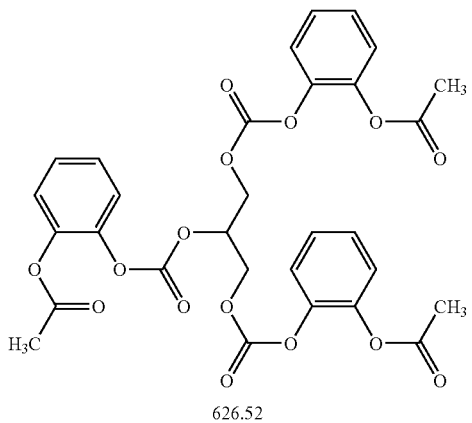
626.52
39
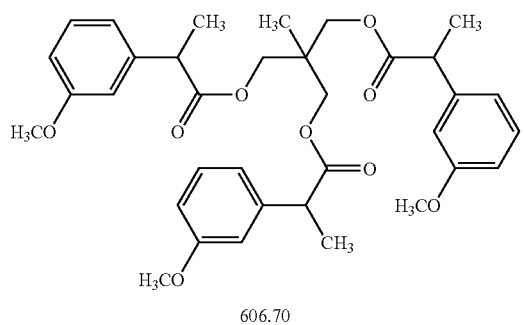
606.70
40
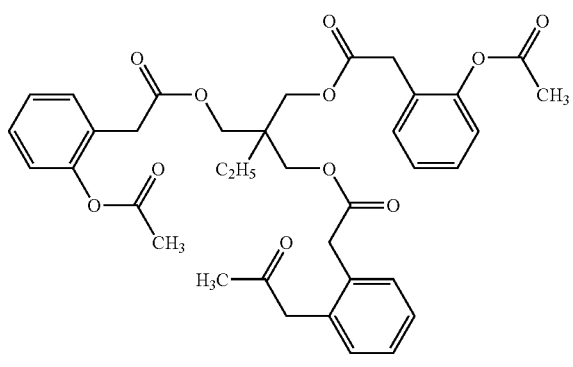
662.68
41
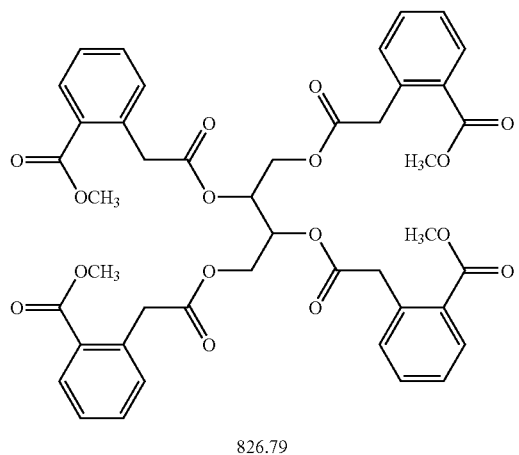
826.79
42
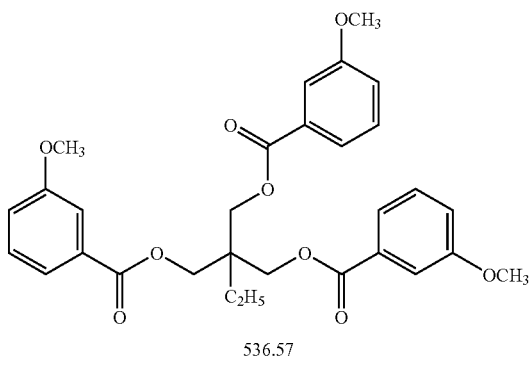
536.57
43
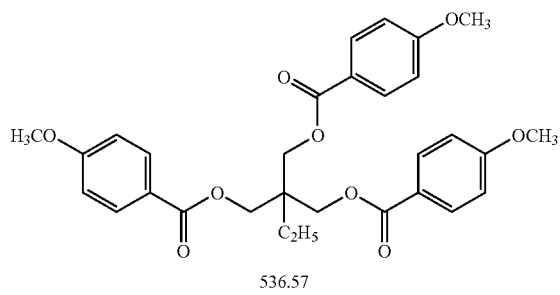
536.57
44
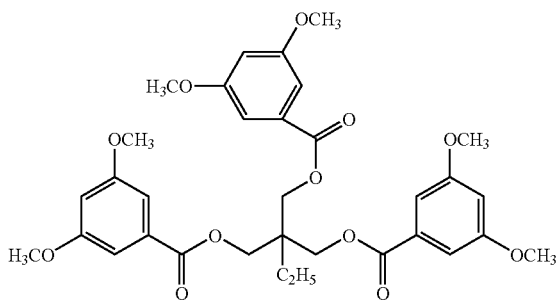
626.65

45
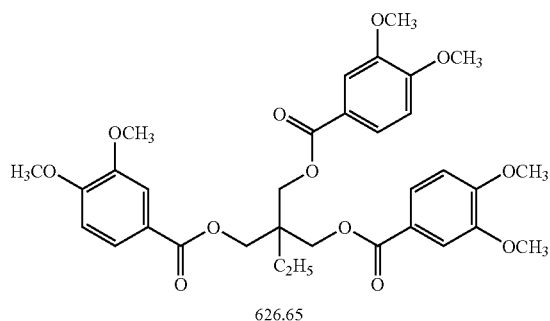
626.65
46
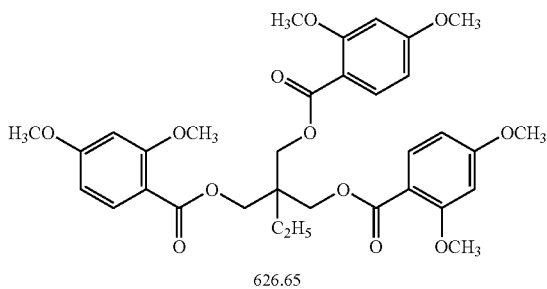
626.65
47
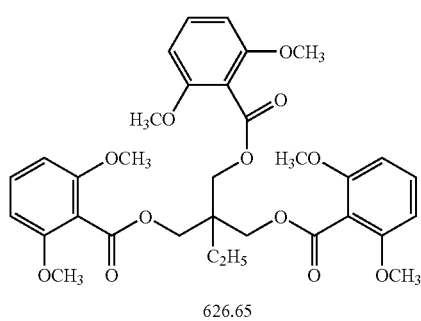
626.65
48
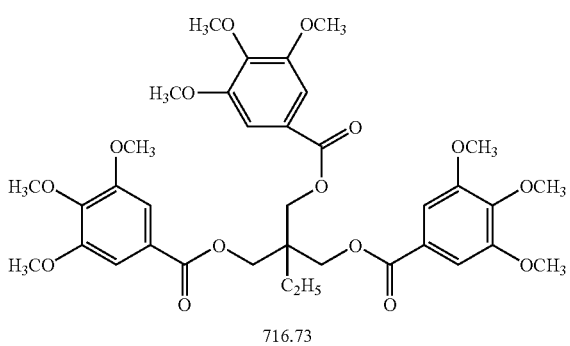
716.73
49
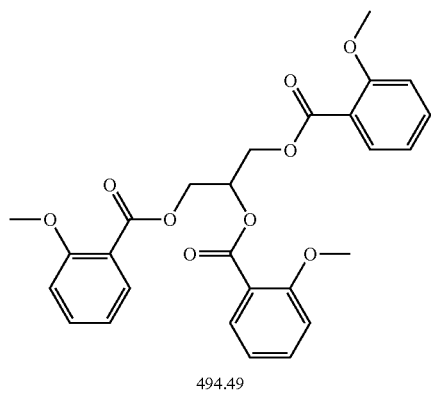
494.49
50
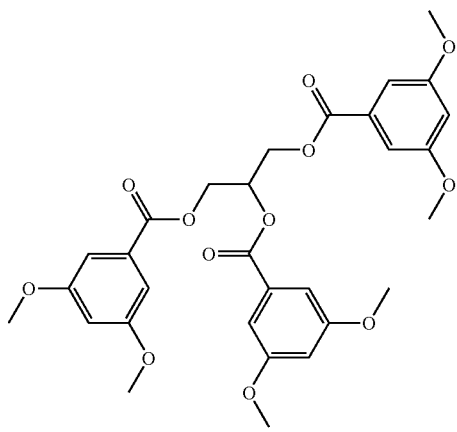
584.57
51
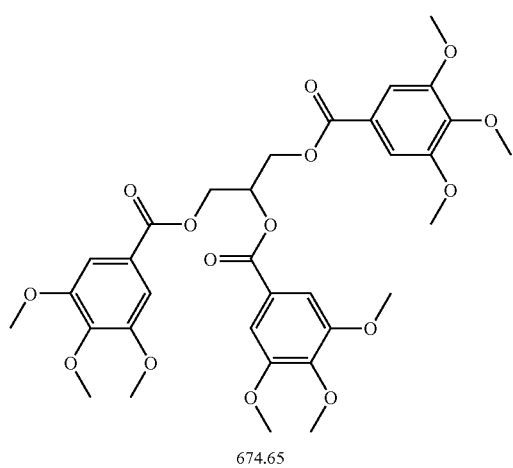
674.65
52
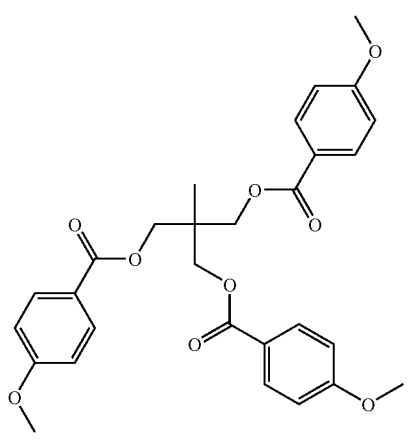
522.54

-continued
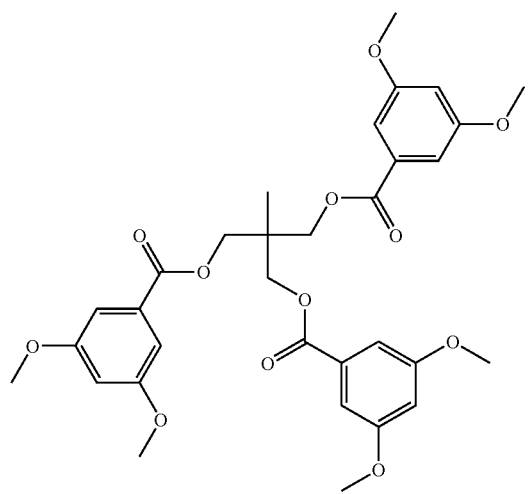
53
612.62
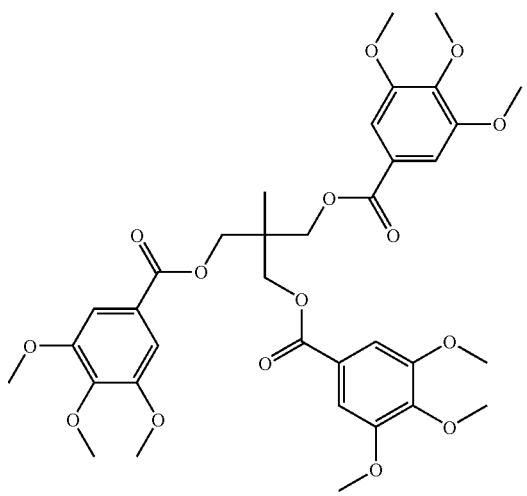
54
702.70
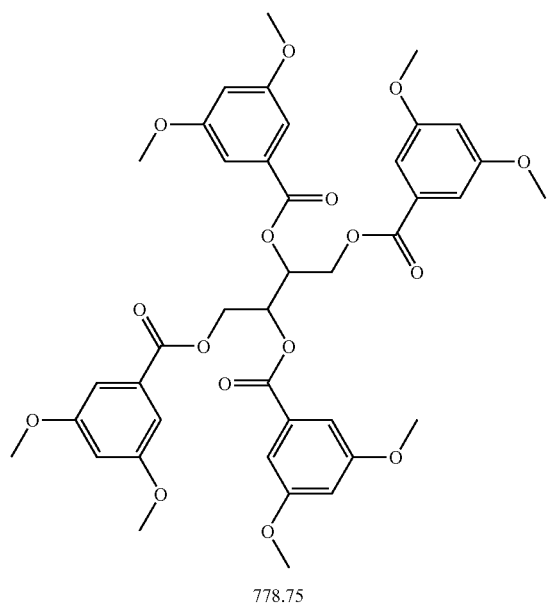
55
778.75
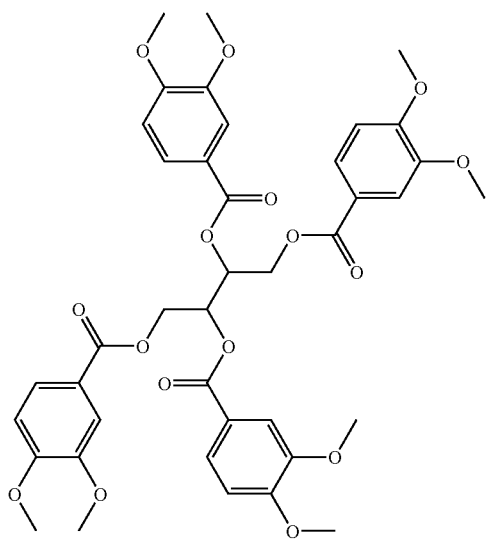
56
778.76

-continued

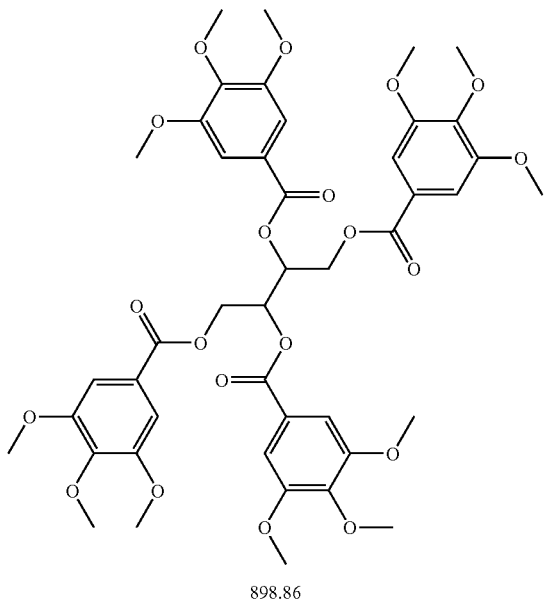

898.86

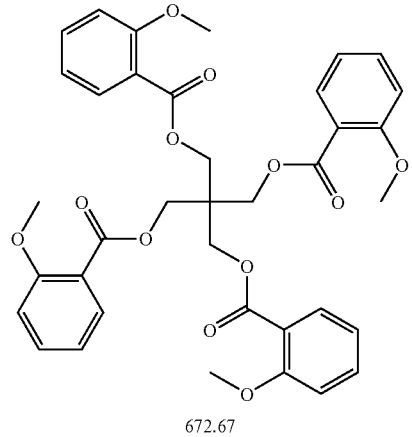

672.67

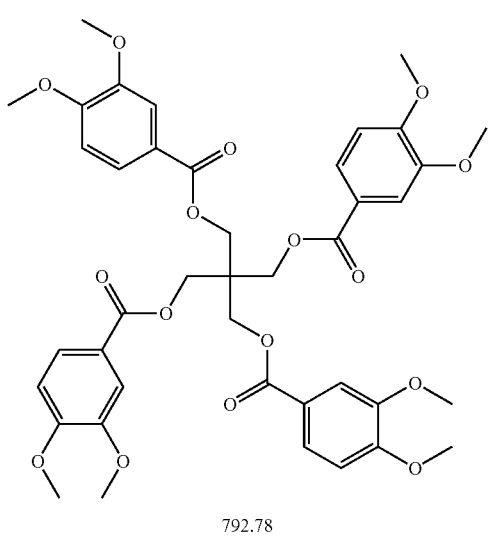

792.78

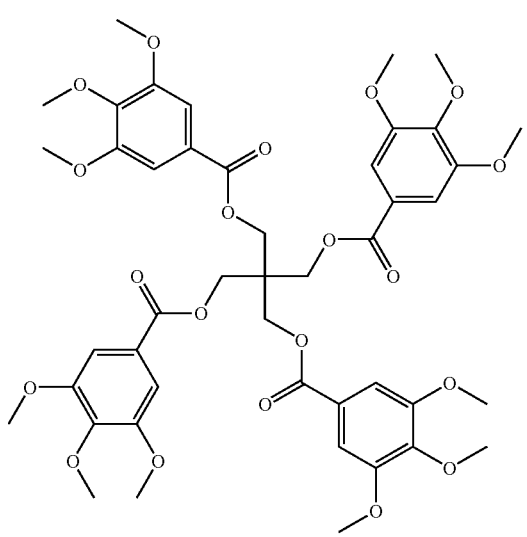

912.88

It is preferable that the cellulose ester film employed in the present invention incorporates esterified compounds produced by employing at least the organic acid represented by Formula (1) and tri- to higher-hydric alcohol as a plasticizer in an amount of 1-25% by weight. Plasticizers other than the above may simultaneously be employed.

The esterified compounds composed of the organic acid represented by above Formula (1) and the tri- to higher-hydric alcohol are characterized in that it is possible to add them to polyesters at a high addition ratio due to their high compatibility to cellulose esters. Consequently, when other plasticizers and additives are simultaneously employed, no bleeding-out is generated, whereby, if desired, it is possible to easily realize the simultaneous use of other types of plasticizers and additives.

Incidentally, when other plasticizers are simultaneously employed, the content of the esterified compounds, as a plasticizer, produced by employing the organic acid represented by Formula (1) and tri- to higher-hydric alcohol, is preferably at least 50% by weight with respect to all plasticizers, is more preferably at least 70%, but is most preferably at least 80%. When employed in the above range, it is possible to realize a definite effect such that when simultaneously employed with other plasticizers, it is possible to enhance flatness of the cellulose ester film during melt casting.

Further, at least one type of the ester based plasticizers selected from the ester based plasticizers composed of polyvalent carboxylic acid and monohydric alcohol also lowers the melting temperature of cellulose esters and exhibits excellent suitability to the process due to low volatility during the melt film production process and after production, and the resulting cellulose ester film excels in optical characteristics, dimensional stability and flatness.

Preferred ester based plasticizers composed of polyvalent carboxylic acid and monohydric alcohol include dioctyl adipate, dicyclohexyl adipate, diphenyl succinate, di2-naphthyl- 1,4-cyclohexane dicarboxylate, tricyclohexyl-tricarbarate, tetra3-methylphenyltetrahydrofuran-2,3,4,5-tetracarboxylate, tetrabutyl-1,2,3,4-cyclopentane tetracarboxylate, triphenyl-1,3,5-cyclohexyl tricarboxylate, triphenylbenzene-1,3, 5'-tetracarboxylate, phthalic acid based plasticizers (for example, diethyl phthalate, dimethoxyethyl phthalate, dimethyl phthalate, dioctyl phthalate, dibutyl phthalate, di-2-ethylhexyl phthalate, dioctyl phthalate, dicyclohexyl phthalate, dicyclohexyl terephthalate, methylphthalylmethyl glycolate, ethylphthalylethyl glycolate, propylphthalylpropyl glycolate, and butylphthalylbutyl glycolate), and citric acid based plasticizers (for example, acetyltrimethyl citrate, acetyltriethyl citrate, and acetyltributyl citrate).

Of the ester based plasticizers composed of the above polyhydric alcohol and carboxylic acid and the ester based plasticizers composed of polyvalent carboxylic acid and monohydric alcohol, preferred are the ester based plasticizers composed of the above polyhydric alcohol and univalent carboxylic acid, namely the plasticizers composed of the organic acid represented by Formula (1) and tri- to higher-hydric alcohol. Further simultaneously employed are the plasticizers composed of the above polyhydric alcohol and carboxylic acid and the ester based plasticizers composed of polyvalent carboxylic acid and monohydric alcohol.

Other plasticizers which are simultaneously employed include aliphatic carboxylic acid-polyhydric alcohol based plasticizers; unsubstituted aromatic carboxylic acid or cycloalkylcaroboxylic acid-polyhydric alcohol ester based plasticizers described in paragraphs 30-33 of JP-A 2003-12823; phosphoric acid ester based plasticizers such as triphenyl phosphate, biphenyldiphenyl phosphate, butylenebis(diethyl phosphate), ethylenebis(diphenyl phosphate), phenylenebis(dibutyl phosphate), phenylenebis(diphenyl phosphate) (ADEKASTAB PFR produced by Asahi Denka Kogyo K.K.), phenylenebis(dixylenyl phosphate) (ADEKASTAB FP500), or bisphenol A diphenyl phosphate (ADEKASTAB FP600); polymer polyesters described, for example, in paragraphs 49-56 of JP-A 2002-22956; and polyether based plasticizers.

However, as noted above, when phosphoric acid based plasticizers are employed in melt film production of cellulose esters, coloring tends to occur, it is preferable to employ phthalic acid ester based plasticizers, polyvalent carboxylic acid ester based plasticizers, citric acid ester based plasticizers, polyester based plasticizers, and polyether based plasticizers.

(Antioxidants)

Decomposition of cellulose esters is accelerated not only via heat but also via oxygen in a relatively high temperature ambience where melt film production is carried out. Consequently, it is preferable to employ, as a stabilizer, antioxidants in the optical film of the present invention.

As useful antioxidants in the present invention, employed may be compounds which retard the degradation of melt molding materials due to oxygen without any specific limitation. Of these, useful antioxidants include hindered phenol based antioxidants, phosphorous based antioxidants, sulfur based antioxidants, heat resistant process stabilizers, and oxygen scavengers. Of these, specifically preferred are hindered phenol based compounds, hindered amine based compounds, phosphorous based compounds and heat resistant process stabilizers.

By blending these antioxidants, it is possible to minimize coloring and any decrease in strength of molded materials due to heat and thermal oxidation deterioration during melt molding, without decreasing transparency and heat resistance.

These antioxidants may be employed individually or in combinations of at least two types.

Of the above antioxidants, preferred are the hindered phenol based antioxidants. The hindered phenol based antioxidants are known compounds which include, for example, 2,6-dialkylphenol derivatives described in U.S. Pat. No. 4,839,405. Of such compounds, preferred compounds include the compounds represented by following Formula (4).

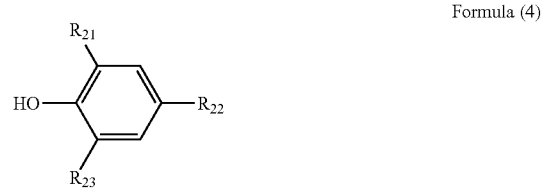

Formula (4)

wherein $R_{21}$, $R_{22}$, and $R_{23}$ each represents a substituted or unsubstituted alkyl substituent. Specific examples of hindered phenol compounds include n-octadecyl 3-(3,5-t-butyl-4-hydroxyphenol)-propionate, n-octadecyl 3-(3,5-di-butyl-4-hydroxyphenyl)-acetate, n-octadecyl 3,5-di-butyl-4-hydroxybenzoate, n-hexyl 3,5-di-t-butyl-4-hydroxyphenylbenzoate, n-dodecyl 3,5-di-t-butyl-4-hydroxyphenylbenzoate, neo-dodecyl 3-(3,5-di-t-butyl-4-hydroxyphenylbenzoate, neo-dodecyl 3-(3,5-di-t-butyl-4-hydroxyphenyl)propionate, dodecyl β(3,5-di-t-butyl-4-hydroxyphenyl)propionate, ethyl α-(4-hydroxy-3,5-di-t-butylphenyl)isobutyrate, octadecyl α-(4-hydroxy-3,5-di-t-butylpenyl)isobutyrate, octadecyl α-(4-hydroxy-3,5-di-t-butyl-4-hydroxyphenyl)propionate, 2-(n-octylthio)ethyl 3,5-di-t-butyl-4-hydroxy-benzoate, 2-(n-octylthio)ethyl 3,5-di-t-butyl-4-hydroxy-phenyl acetate, 2-(n-octadecylthio)ethyl 3,5-di-t-butyl-4-hydroxyphenylacetate, 2-(n-octadecylthio) ethyl 3,5-di-t-butyl-4-hydroxy-benzoate, 2-(2-hydroxyethylthio)ethyl 3,5-di-t-butyl-4-hydroxybenzoate, diethylene glycol bis-(3,5-di-t-butyl-4-hydroxy-phenyl)propionate, 2-(n-octadecylthio)ethyl 3-(3,5-di-t-butyl-4-hydroxyphenyl) propionate, stearylamido-N,N-bis-[ethylene 3-(3,5-di-t-butyl-4-hydroxyphenyl)propionate, n-butylimino-N,N-bis-[ethylene 3-(3,5-di-t-butyl-4-hydroxyphenyl)propionate], 2-(2-stearoyloxyethylthio)ethyl 3,5-di-t-butyl-4-hydroxybenzoate, 2-(2-stearoyloxyethylthio)ethyl 7-(3-methyl-5-t-butyl-4-hydroxyphenyl)heptanoate, 1,2-propyleneglycol bis-[3-(3,5-di-t-butyl-4-hydroxyphenyl)propionate], ethylene glycol bis-[3-(3,5-di-t-butyl-4-hydroxyphenyl)propionate], neopentylglycol bis-[3-(3,5-di-t-butyl-4-hydroxyphenyl)propionate], ethylene glycol bis-(3,5-di-t-butyl-4-hydroxyphenyl acetate), pentaerythritol-tetrakis-[3-(3',5'-di-t-butyl-4'-hydroxyphenyl)propionate], 1,1,1-trimethylolethane-tris-[3-(3,5-di-t-butyl-4-hydroxyphenyl) propionate], sorbitol hexa-[3-(3,5-di-t-butyl-4-hydroxyphenyl)propionate], 2-hydroxyethyl 7-(3-methyl-5-t-butyl-4-hydroxyphenyl)propionate, 2-stearoyloxyethyl 7-(3-methyl-5-t-butyl-4-hydroxyphenyl)heptanoate, 1,6-n-hexanediol-bis[(3',5'-di-t-butyl-4-hydroxyphenyl)propionate], and pentaerythritol-tetrakis(3,5-di-t-butyl-4-hydroxycinnnamate). The above type hindered phenol compounds are available, for example, under the trade name of "IRGANOX 1076" and "IRGANOX 1010" of Ciba Specialty Chemicals Co.

Specific examples of phosphorous based compounds include monophosphite based compounds such as triphenyl phosphite, diphenylisodecyl phosphite, phenylisodecyl phosphite, tris(nonylphenyl)phosphite, tris(dinonylphenyl)phosphite, tris(2,4-di-t-butylphenyl)phosphite, 10-(3,5-di-t-butyl-4-hydroxybenzyl)-9,10-dihydro-9-oxa-10-phosphaphenantholene-10-oxide, or 6-[3-(3-t-butyl-4-hydroxy-5-methylphenyl)propoxy]-2,4,8,10-tetra-t-butyldibenz[d,f][1.3.2]dioxaphosphepin, as well as diphosphite based compounds such as 4,4'-butylidene-bis(3-methyl-6-t-butylphenyl-di-tridecyl phosphite), or 4,4'-isopropylidene-bis(phenyl-di-alkyl(C12-C16) phosphite). Further listed are phosphonate based compounds such as tetrakis (2,4-di-t-butyl-phenyl)-4,4'-biphenylene diphosphonite or tetrakis(2,4-di-t-butyl-5-methylphenyl)-4,4'-biphenylene phsphonite. The above type phosphorous based compounds are available, for example, under the trade names of "SUMILIZER GP" from Sumitomo Chemical Co., Ltd., "ADK STAB PEP-24G and ADK STAB PEP-36" from Asahi Denka Kogyo K.K., "IRGAFOS P-EPQ" form Ciba Specialty Chemicals Co., and "GSY-P101 from Sakai Chemical Industry Co., Ltd.

Specific examples of the hest resistant process stabilizers include acrylate based compounds such as 2-tert-butyl-6-(3-tert-butyl-2-hydroxy-5-methylbenzyl)-4-methylphenyl acrylate or 2-[1-(2-hydroxy-3,5-di-tert-pentylphenyl)ethyl]-4,6-di-tert-pentylphenyl acrylate, as well as benzofuranone based compounds such as 3-[4-(2-acetoxyethoxy)phenyl]-5,7-ditertiary butylbenzofuran-2-one, 5,7-ditertiary butyl-3-[4-(2-stearoyloxyethoxy)phenyl]benzofuran-2-one, 3,3'-bis[5,7-d] tertiary butyl-3-(4-[2-hydroxyethoxy]phenyl)benzofuran-2-one], 5,7-ditertiary butyl-3-(4-methoxyphenyl)benzofuran-2-one, 5,7-ditertiary butyl-3-phenylbenzofuran-2-one, 5,7-ditertiary butyl-4-methyl-3-phenylbenzofuran-2-one, 3-(4-acetoxy-3,5-dimerthylphenyl)-5,7-ditertiary butylbenzofuran-2-one, 3-(3,5-dimethyl-4-pivaroyloxyphenyl)-5,7-ditertiary butylbenzofuran-2-one, 3-(3,4-dimethylphenyl)-5,7-ditertiary butylbenzofuran-2-one, or 3-(2,3-dimethylphenyl)-5,7-ditertiary butyl-benzofuran-2-one. The heat resistant process stabilizers are available under the trade names such as "SUMILIZER GM" or "SUMILIZER GS" from Sumitomo Chemical Co., Ltd.

The added amount of antioxidants is preferably 0.1-10% by weight, is more preferably 0.2-5% by weight, but is most preferably 0.5-2% by weight. At least two of these may be employed simultaneously.

(Acid Scavenger)

Since decomposition of cellulose esters is accelerated via acids under high temperature circumstance where melt casting is carried out, it is preferable that the optical film of the present invention incorporates an acid scavenger as a stabilizing agent. In the present invention, compounds may be employed as a useful acid scavenger without any limitation as long as they react with acids to deactivate them. Of these, preferred are compounds having an epoxy group, described in U.S. Pat. No. 4,137,201. Epoxy compounds as such an acid scavenger are known in the present technical field and include glycidyl ethers of various polyglycols, in particular, polyglycol derived from condensation of about 8—about 40 mol of ethylene oxide per mol of polyglycol, diglycidyl ether of glycerol, metal epoxy compounds (for example, those conventionally employed in a vinyl chloride polymer composition and together with a vinyl chloride polymer composition), expoxidized ether condensation products, diglycidyl ether of bisphenol A (namely, 4,4'-dihydroxydiphenyldimethylmethane), expoxidized unsaturated fatty acid esters (particularly, alkyl esters of 4-2 carbon atoms of fatty acid having 2-22 carbon atoms (for example, butyl epoxystearate)), expoxidized plant oil represented by various expoxidized long chain fatty acid triglycerides (for example, expoxidized soybean oil and expoxidized flax seed oil, and other unsaturated natural oils (occasionally called expoxidized natural glycerides or unsaturated fatty acids, having commonly 12-22 carbon atoms). Further, as a commercial epoxy resin compound having an epoxy group, it is possible to preferably employ EPON 815C and the expoxidized ether oligomer condensation products represented by following Formula (5).

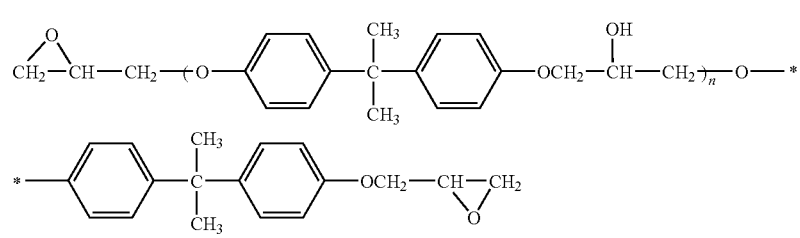

Formula (5)

wherein n is an integer of 0-12. Examples of other employable acid scavengers include those described in paragraphs 87-105 of JP-A 5-194788.

The added amount of the acid scavenger is preferably 0.1-10% by weight, is more preferably 0.2-5% by weight, but is most preferably 0.5-2% by weight. These may be employed in combinations of at least two types.

Incidentally, acid scavengers are sometimes called acid sweepers or acid catchers. In the present invention, application is carried out irrespective of terminology.

(Light Stabilizer)

Other than the above antioxidants, acid scavengers, and UV absorbers, listed as a light stabilizer capable of retarding decomposition of cellulose esters via heat or light are hindered amine compounds, and if needed, light stabilizers may be incorporated in cellulose ester films.

Examples of the above hindered amine compounds (HALS) employed in the present invention include 2,2,6,6-tetraalkylpyperidine compounds as well as acid added salts of those and complexes of those with metal compounds, as described in U.S. Pat. Nos. 4,619,956, columns 5-11, and 4,839,405, columns 3-5. Such compounds include the compounds represented by following Formula (6).

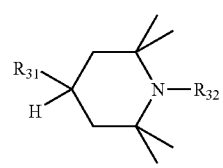

Formula (6)

wherein each of $R_{31}$ and $R_{32}$ represents a substituent. Specific examples of the hindered amine compounds include, but are not limited to, 4-hydroxy-2,2,6,6-tetramethylpyperidine, 1-allyl-4-hydroxy-2,2,6,6-tetramethylpyperidine, 1-benzyl-4-hydroxy-2,2,6,6-tetramethylpyperidine, 1-(4-t-butyl-2-butenyl)-4-hydroxy-2,2,6,6-tetramethylpyperidine, 4-stearoyloxy-2,2,6,6-tetramethylpyperidine, 1-ethyl-4-salicyloyloxy-2,2,6,6-tetramethylpyperidine, 4-methacryloyloxy-1,2,2,6,6-pentamethylpyperidine, 1,2,2,6,6-pentamethylpyperidine, 1,2,6,6-pentamethylpyperidine-4-yl-β(3,5-di-t-butyl-4-hydroxyphenyl)-propionate, 1-benzyl-2,2,6,6-tetramethyl-4-piperidinyl maleinate, (di-2,2,6,6-tetramethylpyperidine-4-yl)-adipate, (di-2,2,6,6-tetramethylpyperidine-4-yl)-sebacate, (di-1,2,3,6-tetramethyl-2,6-diethyl-pyperidine-4-yl)sebacate, (di-1-allyl-2,2,6,6-tetramethyl-pyperidine-4-yl)-phthalate, 1-acetyl-2,2,6,6-tetramethylpyperidine-4-yl-acetate, trimellitic acid-tri-(2,2,6,6-tetramethylpyperidine-4-yl) ester, 1-acryloyl-4-benzyloxy-2,2,6,6-tetramethylpyperidine, dibutyl-malonic acid-di-(1,2,2,6,6-pentamethyl-pyperidine-4-yl)-ester, dibenzyl-malonic acid-di-(1,2,3,6-tetramethyl-2,6-diethyl-pyperidine-4-yl)-ester, dimethyl-bis-(2,2,6,6-tetramethylpyperidine-4-oxy)-silane, tris-(1-propyl-2,2,6,6-tetramethylpyperidine-4-yl)-phosphite, tris-(1-propyl-2,2,6,6-tetramethylpyperidine-4-yl)-phosphate, N,N'-bis-2,2,6,6-tetramethylpyperidine-4-yl)-hexamethylene-1,6-diamine, N,N'-bis-(2,2,6,6-tetramethylpyperidine-4-yl)-hexamethylene-1,6-diacetamide, 1-acetyl-4-(N-cyclohexylacetamido)-2,2,6,6-tetramethyl-pyperidine, 4-benzylamino-2,2,6,6-tetramethylpyperidine, N,N'-bis-(2,2,6,6-tetramethylpyperidine-4-yl)-N,N'-dibutyl-adipamide, N,N'-bis-(2,2,6,6-tetramethylpyperidine-4-yl)-N,N'-dicyclohexyl-(2,2,6,6-tetramethylpyridine-4-yl)-N,N'-dicyclohexyl-(2-hydroxypropylene), N,N'-bis-(2,2,6,6-tetramethylpyperidine-4-yl)-p-xylylene-diamine, 4-(bis-2-hydroxyethyl)-amino-1,2,2,6,6-pentamethylpyperidine, 4-methacrylamido-1,2,2,6,6-pentamethylpyperidine, and α-cyano-β-methyl-β-[N-(2,2,6,6-tetramethylpyperidine-4-yl)]-amino-acrylic acid methyl ester. Preferred hindered amine compounds include following HALS-1 and HALS-2, however the present invention is not limited thereto.

(UV Absorber)

In view of prevention of deterioration of polarizers and display devices due to ultraviolet rays, preferred UV absorbers are those which excel in absorption capability of ultraviolet rays at a wavelength of shorter than 370 nm, and in addition, in view of liquid crystal display properties, preferred ones are those which result in minimal absorption of visible light at a wavelength of longer than 400 nm. As UV absorbers employed in the present invention, listed may, for example, be oxybenzophenone based compounds, benzotriazole based compounds, salicylic acid ester based compounds, benzophenone based compounds, cyanoacrylate based compounds, nickel complex based compounds, and triazine based compounds. Of these, preferred are the benzophenone based compounds, the benzotriazole based compounds which result in minimal coloring, and the triazine based compounds. In addition, UV absorbers may be employed which are described in JP-A Nos. 10-182621 and 8-337574, and polymer UV absorbers may be employed which are described in JP-A Nos. 6-148430 and 2003-113317.

Specific examples of the benzotriazole based UV absorbers include, but are not limited to, 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3", 4", 5", 6"-tetrahydrophthalimidomethy)-5'-methylphenyl)benzotriazole, 2,2-methylenebis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2-(2H-benzotriazole-2-yl)-6-(straight or branched chain dodecyl)-4-methylphenol, a mixture of octyl-3-[3-tert-butyl-4-hydroxy-5-(chloro-2H-benzotriazole-2-yl)phenyl] and 2-ethylhexyl-3-[tert-butyl-4-hydroxy-5-(5-chloro-2H-benzotriazole-2-yl)phenyl]propionate, 2-(2'-hydroxy-3'-(1-me-

HALS-1

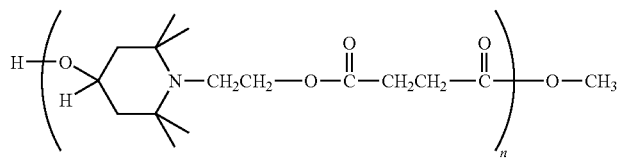

HALS-2

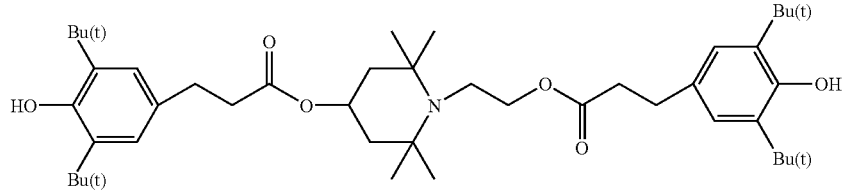

However, it is preferable that at least one type of the above compounds is incorporated. The content of those in cellulose ester resins is preferably 0.01-5% by weight, is more preferably 0.1-3% by weight, but is most preferably 0.2-2% by weight.

It is not preferable that the content of the above compounds is at most the lower limit, since cellulose ester resins tend to undergo thermal decomposition. It is also not preferable that when the content is at least the upper limit, since in view of compatibility with resins, transparency to be needed for the polarizing plate protective film is lowered and the film brittleness tends to result.

thyl-1-phenylethyl)-5'-(1,1,3,3-tetramethylbutyl)-phenyl) benzotriazole, and 2-(2'hydroxy-3',5'-di-(1-methyl-1-phenylethyl)-phenyl)benzotriazole. However, the present invention is not limited thereto.

Further listed as commercial products are, for example, TINUVIN 171, TINUVIN 234, and TINUVIN 360 (all produced by Ciba Specialty Chemicals) as well as LA31 (produced by Asahi Denka Kogyo K.K.).

Specific examples of benzophenone based compounds may include 2,4-dihydroxybenzophenone, 2,2'-dihydroxy-4-methoxybenzophenone, 2-hydroxy-4-methoxy-5-sulfobenzophenone, and bis(2-methoxy-4-hydroxy-5-benzoylphenylethane, however the present invention is not limited thereto.

In the present invention, the added amount of UV absorbers is preferably 0.1-5% by weight, is more preferably 0.2-3% by weight, but is most preferably 0.5-2% by weight. These may be employed in combinations of at least two types.

Further, these benzotriazole structure and benzophenone structure may be introduced in a part of polymer, or may be regularly pendanted to a polymer, and also may be introduced into a part of a molecular structure of the other additives, such as a plasticizer, anti-oxidation agent, and acid scavenger.

(Matting Agent)

In order to provide lubrication properties, it is possible to add minute particles such as a matting agent to the optical film of the present invention. Minute particles include minute particles of inorganic or organic chemical compounds. As matting agents preferred are particles which are as small as possible. Examples of minute particles include minute inorganic particles such as silicon dioxide, titanium dioxide, aluminum oxide, zirconium oxide, calcium carbonate, kaolin, talc, calcinated calcium silicate, hydrated calcium silicate, aluminum silicate, magnesium silicate, or calcium phosphate, as well as minute cross-linked polymer particles. In many cases, minute particles composed of silicon dioxide are subjected to a surface treatment employing organic substances, and such minute particles are preferred since they enable a decrease in film haze.

Organic compounds which are preferably employed for the surface treatment include halosilanes, alkoxysilanes, silazane, and cyclohexane. As the average diameter of minute particles increases, the resulting slip property is enhanced. On the contrary, as it decreases, the resulting transparency is enhanced. Further, the average diameter of the secondary particles is commonly in the range of 0.05-1.0 μm, is preferably 5-50 nm, but is more preferably 7-14 nm. These minute particles are preferably employed in cellulose ester films to result in an asperity of 0.01-1.0 μm on the film surface. The content of the minute particles in cellulose esters is preferably 0.005-0.3% by weight with respect to the cellulose esters.

It is possible to list, as minute silicon dioxide particles, AEROSIL 200, 200V, 300, R972, R972V, R974, R202, R812, OX50, and TT600, produced by Nippon Aerosil Co., Ltd. Of these, preferred are AEROSIL 200V, R972, R972V, R974, R202, and R812. These minute particles may be employed in combinations of at least two types. When at least two types are simultaneously employed, it possible to employ them at any appropriate ratio. In such a case, it may be possible to employ minute particles which differ in their average particle diameter and materials, for example, AEROSIL 200V and R972V in the weight ratio range of 0.1:99.9-99.9:0.1.

(Retardation Controlling Agent)

As another purpose, it is also possible to employ minute particles in films employed as the above matting agent to enhance film strength. Further, when minute particles exhibit birefringence, by utilizing minute particles and retardation generating methods described, for example, in International Patent Publication Open to Public Inspection No. 01/025264 Pamphlet and JP-A 2004-35347, minute particles in optical films are oriented via a stretching process, whereby it is possible to combine retardation values derived from each of the cellulose ester and the above minute particles, which may be employed to enhance the quality of the display of liquid crystal display devices. Further, when it is possible to enhance the orientation of cellulose ester film itself which is employed to constitute the optical film of the present invention, the above minute particles may also be employed.

Further, in order to enhance liquid crystal display quality, polarizing plates may be treated in such a manner that in the optical film of the present invention, a liquid crystal layer is arranged via formation of an orientation film, and optical compensation capability is provided by combining retardations derived from the optical film and the liquid crystal layer. Retardation may be controlled by the addition of retardation controlling agents such as aromatic compounds having at least two aromatic rings, described in European Patent No. 911,656A2. Further, at least two types of the aromatic compounds may be employed simultaneously. The aromatic ring of the above aromatic compounds incorporates an aromatic heterocyclic ring in addition to an aromatic hydrocarbon ring. Particularly preferred are aromatic heterocyclic rings, while the above aromatic heterocyclic rings are commonly an unsaturated heterocyclic ring. Of these, particularly preferred is a 1,3,5-triazine ring.

(Polymer Materials)

In the optical film of the present invention, polymer materials and oligomers, other than polyesters, may be selected as appropriate and blended. The above preferred polymer materials and oligomers are those which excel in compatibility with cellulose esters. When modified to film, the resulting transparency is preferably at least 80%, is more preferably at least 90%, but is most preferably 92%. The purpose of blending with at least one type of the polymer materials or oligomers includes meaning of the viscosity control during heat melting and enhancement of physical properties of films after these treatments. In this case, it is possible to include them as the above other additives.

(Drying)

It is preferable that the above cellulose esters, additives, polymer materials and recovered cellulose esters are dried prior to heat melting or during heat melting. Drying, as described herein, refers to removal of any moisture absorbed by any of the molten materials, water or solvents employed during preparation of mixtures of cellulose esters, as well as additives and solvents included during the synthesis of additives.

The above removal may be carried out by application of drying methods known in the art, such as a heating method, a pressure-reducing method, or a heating pressure-reducing method. Drying may be carried out in an ambience of air or nitrogen, selected as an inert gas. When these drying methods known in the art is carried out, it is preferable that in terms of film quality, drying are carried out within the temperature range which results in no decomposition of employed materials.

For example, the residual moisture or solvents after removal via the drying methods, known in the art, are controlled to be preferably at most 10% by weight with respect to the total of each composition, is more preferably at most 5% by weight, is further more preferably at most 1% by weight, but is most preferably 0.1%. During the above drying, the temperature is preferably in the range of at least 100° C.—at most the Tg. When including an aspect in which materials fuse to each other, the drying temperature is more preferably in the range of at least 100° C.—at most (Tg−5)° C., but is most preferably in the range of at least 110° C.-(Tg−20)°αC. The drying period is preferably 0.5-24 hours, is more preferably 1-18 hours, but is most preferably 1.5-12 hours. When the drying temperature is lower than the lower limit, the drying period occasionally too long, while when materials to be dried exhibit a Tg, by applying the drying temperature equal to or higher than the Tg, occasionally, materials may fuse with each other to make handling them difficult.

The drying process may be divided into at least two stages. For example, molten film production may be carried out via the storage of materials through a preliminary drying process and a just previous drying process which is conducted right— one week prior to the molten film production.

(Film Production)

It is possible to produce the optical film of the present invention referring to the methods described, for example, in U.S. Pat. Nos. 2,492,978, 2,739,070, 2,739,069, 2,492,977, 2,336,310, 2,367,603, and 2,607,704; British Patent Nos. 64,071 and 735,892; Examined Japanese Patent Publication Nos. 45-9074, 49-4554, 49-5614, 60-27562, 61-39890, and 62-4208.

For example, after a mixture of cellulose esters and additives is subjected to heated air drying or vacuum drying, solvents are added and mixed. The resulting mixture is melt-extruded and extruded into a film shape via a T die. Thereafter, the resulting film is tightly adhered to a cooling drum via an electrostatic charge applying method, and solidified by cooling, whereby an unstretched film is prepared. It is preferable to maintain the temperature of the cooling drum between 90-150° C.

Melt extrusion may be carried out via a uniaxial extruder or a biaxial extruder, or further by a biaxial extruder which is linked downstream with a uniaxial extruder. Further, it is preferable that raw material feeding and melting processes, in which a raw material tank, a raw material charging section, and the interior of the extruder are included, are subjected to exchange of ambient air with inert gases such as nitrogen, or reduced pressure.

It is preferable that raw materials incorporating cellulose are melted and passed through filters to remove foreign matter, followed by extrusion via a die.

It is possible to remove added hydrogen bonding solvents via a method in which in the melting process, for example, vent holes are arranged in front of or behind the above filter. At that time, arranged may be a liquid feeding apparatus such as a gear pump in the process prior to the vent holes. Further listed are methods in which after extrusion into a film shape from a die, the resulting film is heated via an infrared ray heater so that solvents are evaporated, and in which film is immersed into film whereby solvents are removed.

When a polarizing plate is prepared by employing the optical film of the present invention as a polarizing plate protective film, it is particularly preferred that the above cellulose ester film is prepared by stretching in the lateral direction or the film casting direction.

It is preferable that the above unstretched film prepared by peeling from the cooling drum is heated to the temperature range between the glass transition temperature (Tg) and Tg+100° C. via heating devices such as a plurality of roller groups and/or infrared heaters, followed by single stage or multistage longitudinal stretching. Subsequently, it is preferable that the cellulose ester film, prepared as above, which has been stretched in the longitudinal direction, is laterally stretched in the temperature range between Tg and Tg-20° C., followed by thermal fixing.

When stretched laterally, it is preferable that stretching is carried out in the stretching region which is divided into at least two parts while gradually raising the temperature within the temperature difference of 1-50° C. since it is possible to make the distribution of physical properties in the lateral direction more uniform. Further, after the lateral stretching, it is preferable that the temperature of the film is maintained between the final lateral stretching temperature and Tg-40° C. for 0.01-5 minutes since the distribution of physical properties in the lateral direction becomes more uniform.

Thermal fixing is commonly carried out in the temperature range between the temperature higher than the final stretching temperature and Tg-20° C. for 0.5-300 seconds. It is preferable that the above thermal fixing is carried out in a region which is divided into at least two sections in the range of the temperature difference between 1-10° C. while gradually raising the temperature.

The thermally fixed film is commonly cooled to at most the Tg, and clipped portions at both edges of the film are trimmed, followed by winding. At that time, it is preferable to carry out a 0.1-10% relaxation treatment in the lateral direction and/or the longitudinal direction at a temperature range between at most the final thermal fixing temperature and at least the Tg. Further, it is preferable that gradual cooling is carried out at a cooling rate of at most 100° C./minute from the final thermal fixing temperature to the Tg. Methods for cooling and relaxation treatments are not particularly limited, and the methods known in the art are available. In view of enhancement of dimensional stability of the film, it is particularly preferable that the above treatments are carried out in a plurality of temperature regions during sequential cooling. Incidentally, "cooling rate" refers to the value obtained by (T1-Tg)/t, where T1 is the final thermal fixing temperature and t is the time necessary for film to reach the Tg from the final thermal fixing temperature.

More optimal conditions of these thermal fixing conditions, and cooling and relaxation conditions differ depending on the cellulose ester which constitutes the film. Therefore, by determining physical properties of the resulting biaxially stretched film, the appropriate conditions may be determined to result in the preferred characteristics.

(Functional Layer)

During production of the optical cellulose ester film of the present invention, prior to and/or after stretching, coated may be functional layers such as an antistatic layer, a hard coating layer, a highly adhesive layer, an antiglare layer, a barrier layer, or an optical compensation layer. In such a case, if desired, applied may be various surface treatments such as a corona discharge treatment, a plasma treatment, or a chemical treatment.

It is possible to prepare cellulose ester films of a multilayer structure by co-extruding compositions incorporating cellulose resins in which the concentration of additives, such as the above plasticizers, UV absorbers, or the matting agent, differ. For example, it is possible to prepare a cellulose ester film structured of a skin layer/core layer/skin layer. For example, the amount of matting agents is relatively large in the skin layer, or they may be incorporated only in the skin layer. It is possible to incorporate plasticizers and UV absorbers into the skin layer in a larger amount than that in the skin layer, or they may be incorporated only in the core layer. Further, the types of plasticizers and UV absorbers may be changed in the core layer and the skin layer. For example, incorporated in the skin layer are low volatile plasticizers and/or UV absorbers, while incorporated in the core layer are plasticizers which exhibit excellent plasticity or UV absorbs which exhibit excellent ultraviolet ray absorbability. The Tg of the skin layer may be different from that of the core layer. It is preferable that the Tg of the core layer is lower than that of the skin layer. Further, the viscosity of melt incorporating cellulose ester during melt extrusion may differ between the skin layer and the core layer, and either viscosity of the skin layer>viscosity of the core layer or viscosity of the core layer≧viscosity of the skin layer may be acceptable.

It is possible to employ the optical film of the present invention as a polarizing plate protective film. When employed as a polarizing plate protective film, the preparation methods of the polarizing plate are not particularly limited and it may be prepared via common methods. Such a prepared polarizing plate protective film is subjected to an alkali treatment, and adhered, employing an aqueous completely saponified polyvinyl alcohol solution, to both sides of the polarizer which has been prepared by immerse-stretching a polyvinyl alcohol film in an iodine solution. This method is preferable since it is possible to allow the optical film, which is the polarizing plate protective film of the present invention, to be adhered directly to the polarizer.

Further, instead of the above alkali treatment, the polarizing plate may be subjected to a treatment to achieve easier adhesion, described in JP-A Nos. 6-94915 and 118232.

The polarizing plate is structured of a polarizer and a protective film which protects both sides thereof. It is further structured in such a manner that a protective film is adhered to one side of the above polarizing plate and a separate film is adhered to the other side. The protective film and the separate are employed to protect the polarizing plate during shipping of the polarizing plates and product inspection. In this case, the protective film is adhered to protect the surface of polarizing plates, is employed on the side opposite to the side to which the polarizing plate is adhered to a liquid crystal plate. Further, the separate film is employed to cover an adhesive layer which is adhered to the liquid crystal plate and employed on the side where the polarizing plate is adhered to the liquid crystal plate.

(Composition)

In the optical film of the present invention, which is prepared via the melt casting method, "composition", as described herein, includes cellulose esters, plasticizers, and antioxidants which constitute the film. Further, if needed, added may be UV absorbers, slipping agents as a matting agent, and the above minute particles to control the strength and optical properties of films. Further added may be the above retardation controlling agents.

The presence of additives in the composition realizes excellent retardation or prevention of generation of volatile components due to modification and decomposition with respect to at least one type of materials such as the above cellulose esters, plasticizers, antioxidants, as well as other materials such as the matting agents, or the retardation controlling agents which constitute the film.

(Stretching Operation and Refractive Index Control)

It is possible to control the refractive index of the optical film of the present invention via a stretching operation. It is possible to control the refractive index within the preferred range by a stretching operation by a factor of 1.0-2.0 in one direction of cellulose ester and by a factor of 1.01-2.5 perpendicular to the above direction on the in-plane film.

For example, it is possible to carry out stretching sequentially or simultaneously in the longitudinal direction of the film and in the perpendicular direction on the film in-plane, namely in the lateral direction. In such a case, when a stretching factor is excessively small for at least one direction, insufficient retardation is realized, while when it is excessively large, it becomes difficult to carry out stretching and breakage occasionally results.

For example, when melted and stretched in the casting direction, excessive contraction in the lateral direction results in an excessively high refractive index in the film thickness direction. In such a case, it is possible to overcome the above via retardation of lateral contraction of the film or stretching in the lateral direction. When stretched in the lateral direction, occasionally, non-uniform distribution in the lateral direction results. Such non-uniform distribution occasionally occurs when a tenter method is employed. This phenomenon is thought to occur in such a manner that by stretching in the lateral direction, contraction force is generated in the central portion of the film, while the edge portions are fixed, and is considered as the so-called boing phenomenon. In this case, by stretching in the casting direction, it is possible to retard the boing phenomenon, whereby it is possible to make the retardation distribution in the lateral direction more uniform.

Further, by stretching in biaxial directions, which are perpendicular to each other, it is possible to reduce the thickness fluctuation of the resulting film. Excessively large thickness fluctuation of optical films results in non-uniform retardation, and when employed in a liquid crystal display, occasionally, non-uniformity due to coloring becomes problematic.

Thickness fluctuation of cellulose ester film supports is preferably within ±3% but is more preferably within ±1%. In the above purpose, a method is effective, in which stretching is carried out in biaxial directions which are perpendicular to each other. It is preferable that the final stretching factors in the biaxial directions which are perpendicular to each other are set to be in the range of 1.0-2.0 in the casting direction and 1.01-2.5 in the lateral direction. In practice, it is preferable that stretching is carried out in the factor range of 1.01-1.5 in the casting direction and of 1.05-2.0 in the lateral direction.

When cellulose esters, which result in positive birefringence via stress, are employed, via stretching in the lateral direction, it is possible to provide a delayed phase axis of optical films in the lateral direction. In this case, in the present invention, in order to enhance display quality, it is preferable that the delayed phase axis of optical film is in the lateral direction and it is necessary that the following relationship is satisfied:

(Stretching factor in the lateral direction)>(stretching factor in the casting direction)

Methods to stretch a web are not particularly limited, and examples thereof include: a method in which a plurality of rollers is subjected in difference in the peripheral speed, whereby stretching is carried out in the longitudinal direction, utilizing the difference in the peripheral speed of rollers, a method in which both edges of a web are fixed via clips or pins and stretching in the longitudinal direction is achieved by spreading the distance between the clips or pins in the moving direction; a method in which the above distance is spread in the lateral direction in the same manner as above, whereby stretching in the lateral direction is carried out; or a method in which the longitudinal and lateral distance are simultaneously spread, whereby stretching in the longitudinal and lateral directions is carried out. Of course, these methods may be employed in combinations. Further, in the case of the so-called tenter method, it is preferable to drive clip portions employing a linear drive system, whereby it is possible to carry out smooth stretching, to result in decreased danger such as breakage.

It is preferable that such width retention and stretching in the lateral direction during any film production process are carried out employing a tenter, and a pin tenter or a clip tenter may be employed.

When the optical cellulose ester film of the present invention is employed as a polarizing plate protective film, the thickness of the above protective film is preferably 10-500 μm, is more preferably at least 20 μm, but is further more preferably at least 35 μm. Further, the thickness is preferably at most 150 μm, but is more preferably at most 120 μm. The thickness is most preferably 25-90 μm. When the cellulose ester film is more than the upper limit, the thickness of the resulting polarizing plates is excessive, whereby liquid crystal displays employed in laptop computers or mobile type electronic devices are not suitable for a targeted thin device being light in weight. On the other hand, it is not preferable that the thickness is less than the lower limit, since it becomes difficult to generate retardation and moisture permeability of the film is not sufficient, whereby the targeted capability of protecting a polarizer from moisture is degraded.

A delayed phase axis or an advanced phase axis of the optical cellulose ester film of the present invention exists within the film plane, and θ1 is preferably −1° to +1°, but is more preferably −0.5° to +0.5° C., where θ1 represents the angle with respect to the film producing direction. It is possible to define above θ1 as an orientation angle, and to determine θ1 by employing an automatic birefringence analyzer, KOBRA-21ADH (manufactured by Oji Scientific Instruments Co., Ltd.).

When θ1 each satisfies the above relationship, it is possible to obtain high luminance in displayed images, to contribute to retardation or prevention of light leakage, and also to contribute to realize more faithful color reproduction in color liquid crystal display devices.

(Liquid Crystal Display Device)

In liquid crystal display devices, a substrate incorporating liquid crystals between two polarizing plates is commonly arranged. The polarizing plate protective film, to which the optical film of the present invention is applied, results in excellent display properties, even though arranged in any of the positions. Specifically, in a polarizing plate protective film on the uppermost surface on the display side of the liquid crystal display device, a clear hard coating layer, an antiglaring layer and an antireflective layer are arranged, and it is particularly preferable to employ the above polarizing plate protective film in the above portion.

EXAMPLE

The present invention will now be detailed with reference to an example, however the present invention is not limited thereto.

Example (Preparation of Optical Film)
(Employed Material)
The following materials were employed.
<Cellulose Ester>
C-1: cellulose acetate propionate at a degree of substitution by an acetyl group of 1.9, a degree of substitution by a propionyl group of 0.7, and a weight average molecular weight of 195,000
C-2: cellulose acetate propionate at a degree of substitution by an acetyl group of 1.7, a degree of substitution by a propionyl group of 0.9, and a weight average molecular weight of 189,000
C-3: cellulose acetate propionate at a degree of substitution by an acetyl group of 1.5, a degree of substitution by a propionyl group of 1.0, and a weight average molecular weight of 192,000
C-4: cellulose acetate propionate at a degree of substitution by an acetyl group of 1.3, a degree of substitution by a propionyl group of 1.3, and a weight average molecular weight of 201,000

The weight average molecular weight was determined via GPC HLC-8220 (manufactured by Tosoh Corp.).
<Plasticizer>
TMPTB: trimethylolpropane tribenzoate
ATBC: acetyltributyl citrate
PETB: pentaerythritol tetrabenzoate and
compounds listed in Table 1
<Stabilizer>
A-1: IRGANOX-1010 (produced by Ciba Specialty Chemicals Co.)
A-2: TINUVIN 144 (produced by Ciba Specialty Chemicals Co.)
A-3: SUMILIZER-GP (produced by Sumitomo Chemical Co., Ltd.)
<UV Absorber>
LA-31 (produced by Asahi Denka Kogyo K. K.
<Matting Agent>
AEROSIL R972V (Nippon Aerosil Co., Ltd.)
(Preparation of Optical Film 1)

After mixing 100 parts by weight of Cellulose Ester C-1, 10 parts by weight of plasticizer TMPTB, 1 part by weight of UV absorber LA-31, and 0.3 parts by weight of matting agent AEROSIL R972V, the resulting mixture was dried at 90° C. under reduced pressure for 5 hours. The dried mixture was melted in a nitrogen ambience under melting conditions of 240° C. and a screw rotation rate of 200 rpm, employing a biaxial melt extruder. The melted mixture was cast via a T die onto a drum to result in a film thickness of 80 μm, followed by peeling and winding, whereby Optical Film 1 was prepared.

(Preparation of Optical Film 2)

After mixing 100 parts by weight of Cellulose Ester C-1, 10 parts by weight of plasticizer TMPTB, 1 part by weight of UV absorber LA-31, and 0.3 part by weight of matting agent AEROSIL R972V, the resulting mixture was dried at 90° C. under reduced pressure for 5 hours, followed by blending of 0.01 part by weight of 1-dodecanol as a hydrogen bonding solvent. The resulting mixture was melted in a nitrogen ambience under melting conditions of 240° C. and a screw rotation rate of 200 rpm, employing a biaxial melt extruder. The melted mixture was cast via a T die onto a drum to result in a film thickness of 80 μm, followed by peeling and winding, whereby Optical Film 2 was prepared.

(Preparation of Optical Films 3-19)

Optical Films 3-19 were prepared in the same manner as Optical Film 2, except that the materials and melting temperatures listed in Table 1 were employed. The same UV absorber and matting agent as those in Optical Film 2 were employed, and in Optical Films 10-19, two types of the stabilizer, listed in Table 1, were simultaneously employed.

Further, some of the added hydrogen bonding solvent was removed via the removal method described in Table 1.

The removal method includes:

1: vaporized solvents are sucked by the vent hole arranged in a melt extruder

2: in addition to above operation 1, the film cast from a die is heated by an infrared heater 3: in addition to above operation 1, the film cast from a die is immersed into water, followed by heating via an infrared heater

TABLE 1

| Optical Film No. | Cellulose Ester | Plasticizer | Antioxidant 1 Type | Antioxidant 1 Amount | Antioxidant 2 Type | Antioxidant 2 Amount | Hydrogen Bonding Solvent | Melting Temperature (° C.) | Solvent Removal Method | Remarks |
|---|---|---|---|---|---|---|---|---|---|---|
| 1 | C-1 | TMPTB | A-1 | 1 | — | — | — | 240 | — | Comp. |
| 2 | C-1 | TMPTB | A-1 | 1 | — | — | 1-dodecanol | 240 | — | Inv. |
| 3 | C-3 | Chemical 5 | A-2 | 1 | — | — | 1-dodecanol | 240 | 1 | Inv. |
| 4 | C-2 | Chemical 45 | A-3 | 3 | — | — | 2-octanol | 240 | 2 | Inv. |
| 5 | C-1 | TMPTB | A-1 | 1 | — | — | 1-dodecanol | 240 | — | Inv. |
| 6 | C-4 | PETB | A-1 | 0.5 | — | — | acetone | 240 | — | Inv. |
| 7 | C-2 | Chemical 5 | A-2 | 1 | — | — | 2-octanol | 240 | — | Inv. |
| 8 | C-2 | TMPTB | A-2 | 1 | — | — | diethyl ether | 250 | — | Inv. |
| 9 | C-2 | Chemical 9 | A-3 | 3 | — | — | 2-octanol | 240 | 2 | Inv. |
| 10 | C-4 | Chemical 9 | A-1 | 0.5 | A-2 | 0.5 | ethanol | 220 | 3 | Inv. |
| 11 | C-1 | Chemical 48 | A-1 | 0.5 | A-3 | 3 | ethylene glycol | 230 | 3 | Inv. |
| 12 | C-4 | TMPTB | A-1 | 0.5 | A-2 | 0.5 | ethanol | 230 | 3 | Inv. |
| 13 | C-4 | PETB | A-1 | 0.5 | A-3 | 3 | ethylene glycol | 230 | 2 | Inv. |
| 14 | C-1 | Chemical 48 | A-1 | 1 | A-3 | 3 | 1-dodecanol | 250 | 1 | Inv. |
| 15 | C-3 | Chemical 45 | A-2 | 0.5 | A-3 | 3 | 2-octanol | 220 | 1 | Inv. |
| 16 | C-1 | TMPTB | A-2 | 0.5 | A-3 | 3 | acetonitrile | 250 | — | Comp. |
| 17 | C-1 | Chemical 45 | A-1 | 0.5 | A-3 | 3 | glycerin | 240 | 3 | Inv. |
| 18 | C-3 | Chemical 9 | A-2 | 0.5 | A-3 | 3 | tetrahydrofuran | 240 | 2 | Inv. |
| 19 | C-4 | ATBC | A-1 | 0.5 | A-2 | 0.5 | ethanol | 230 | 3 | Inv. |

"Amount" represents parts by weight with respect to 100 parts by weight of cellulose ester.
Comp.: Comparative Example, Inv.: Present Invention (Measurement and Evaluation of Optical Film)
(Quantitative Determination of Incorporated Solvent)

Quantitative determination of the amount (namely the amount of residual solvents) of solvents incorporated in the prepared optical film was made employing HEAD SPACE GAS CHROMATOGAPHY HP5890 and HEAD SPACE SAMPLER HP7694 (both manufactured by Yokokawa Analytical System Co.).

The prepared optical films were evaluated for formability, strength, moisture permeability and bleed-out.

(Formability)

Thickness of the prepared film was determined at 10 locations in the longitudinal and lateral directions at intervals of 5 cm, and the standard deviation of the film thickness was calculated, followed by evaluation based on the following criteria.

A: standard deviation of the film thickness was 0—less than 1 μm
B: standard deviation of the film thickness was 1—less than 2 μM
C: standard deviation of the film thickness was 2—less than 5 μm
D: standard deviation of the film thickness was at least 5 μm (Strength)

Rupture elongation in the casting direction of the optical film was determined at room temperature employing TENSIRON, a mechanical strength tester, and evaluated based on the following criteria.

A: rupture elongation was at least 30%
B: rupture elongation was 20—less than 30%
C: rupture elongation was 10—less than 20%
D: rupture elongation was 5—less than 10%
E: rupture elongation was 0—less than 5%

(Moisture Permeability)

Moisture permeability was determined at 40° C. and 90% relative humidity based on the method described in JIS Z 0208 and evaluated based on the following criteria.

A: relative moisture permeability was 0—less than 10%
B: relative moisture permeability was 10—less than 120%
C: relative moisture permeability was 120—less than 140%
D: relative moisture permeability was at least 140%

The lower the value of relative moisture permeability becomes, the more preferred it is.

(Bleed-Out)

After allowing an optical film to stand in an ambience of 80° C. and 90% relative humidity over two weeks, the resulting film was allowed to further stand in an ambience of 23° C. and 55% relative humidity over one day. Characters were written onto the resulting optical film employing a felt pen. The optical film which resulted in character bleeding was evaluated as criteria B, while the same which resulted in no character bleeding was evaluated as criteria A.

Table 2 shows the measurement and evaluation results.

TABLE 2

| Optical Film No. | Solvent Content Before Melting | Solvent Content Film | Formability | Strength | Moisture Permeability | Bleed-Out | Remarks |
|---|---|---|---|---|---|---|---|
| 1 | 0 | 0 | D | C | C | A | Comp. |
| 2 | 0.01 | 0.007 | C | B | B | A | Inv. |
| 3 | 3 | 2.7 | B | B | C | B | Inv. |
| 4 | 5 | 3 | B | B | C | B | Inv. |
| 5 | 0.5 | 0.4 | B | B | B | A | Inv. |
| 6 | 1 | 0.006 | B | B | A | A | Inv. |
| 7 | 2 | 1.4 | A | B | B | A | Inv. |
| 8 | 0.5 | 0.007 | B | B | A | A | Inv. |

TABLE 2-continued

| Optical Film No. | Solvent Content Before Melting | Film | Formability | Strength | Moisture Permeability | Bleed-Out | Remarks |
|---|---|---|---|---|---|---|---|
| 9 | 2 | 0.01 | A | B | A | A | Inv. |
| 10 | 4 | 0.01 | A | B | A | A | Inv. |
| 11 | 3 | 0.1 | A | B | B | A | Inv. |
| 12 | 10 | 0.3 | A | C | C | A | Inv. |
| 13 | 10 | 7 | A | C | C | B | Inv. |
| 14 | 2 | 0.005 | B | B | A | A | Inv. |
| 15 | 5 | 1.9 | A | B | B | A | Inv. |
| 16 | 2 | 0.1 | D | B | C | B | Comp. |
| 17 | 2 | 0.1 | A | B | B | A | Inv. |
| 18 | 1 | 0.02 | B | B | A | A | Inv. |
| 19 | 10 | 0.3 | B | C | C | B | Inv. |

"Solvent Content" represents parts by weight with respect to 100 parts by weight of cellulose esters.
Comp.: Comparative Example, Inv.: Present Invention As can be seen from Table 2, the optical films of the present invention exhibited lower melt viscosity and desired formability, strength and moisture permeability, irrespective of types of cellulose esters.

Optical films which were prepared in the same manner as Optical Film 2, except that 1-dodecanole was replaced with methanol, propanol, or isopropanol, each of which is a hydrogen bonding solvent, resulted in desired formability, strength, moisture permeability and bleed-out.

(Preparation of Polarizing Plate)

A 120 μm thick polyvinyl alcohol film was immersed into an aqueous solution incorporating one part by weight of iodine, two parts by weight of potassium iodide, and 4 parts by weights of boric acid, and was stretched at 50° C. by a factor of 4, whereby a polarizer was prepared.

The prepared optical film was subjected to an alkali treatment in a 2.5 mol/L sodium hydroxide aqueous solution for 600 seconds, and subsequently washed and dried, whereby the film surface was subjected to an alkali treatment.

The alkali-treated side of the optical film was adhered to both sides of the aforesaid polarizer, employing a 5 weight % completely saponified type polyvinyl alcohol aqueous solution as an adhesive agent, whereby a polarizing plate on which a protective film was formed was prepared.

The polarizing plates of the present invention, which were prepared employing each of the optical films of the present invention, were ones which were optically and physically excellent and exhibited desired polarization angle, compared to the comparative polarizing plates prepared by employing each of the optical films of the comparative examples.

(Evaluation as Liquid Crystal Display Device)

The polarizing plate of 15 type TFT type color liquid crystal display LA-15291HM (manufactured by NEC Corp.) was peeled off and cut to match the size of each of the liquid crystal cells prepared as above. Two polarizing plates prepared as above were adhered to both sides of a liquid crystal cell being perpendicular to each other so that each polarizing axis remained the same as before, and a 15 type TFT type color liquid crystal display was prepared. Subsequently, characteristics as a polarizing plate of the cellulose ester film were evaluated. The polarizing plate of the present invention exhibited higher contrast and excellent display properties, compared to the comparative polarizing plate. Based on the above, it was confirmed that the polarizing plates of the present invention were excellent as those for image display devices, such as a liquid crystal display.

What is claimed is:

1. A method of manufacturing an optical cellulose ester film comprising the steps of:
   (a) mixing a cellulose ester (A); at least one ester based plasticizer (B) of ester based plasticizers composed of polyhydric alcohol and univalent carboxylic acid and ester based plasticizers composed of polyvalent carboxylic acid and monohydric alcohol; at least one stabilizer (C) selected from a group consisting of a phenol based stabilizer, a hindered amine based stabilizer and a phosphorous based stabilizer; and a hydrogen bonding solvent (D), wherein the mixing includes:
      (i) mixing the cellulose ester (A), the ester based plasticizer (B), and the stabilizer (C) so as to form a mixture;
      (ii) drying the mixture, and
      (iii) mixing the dried mixture and the hydrogen bonding solvent (D) so as to prepare a composition,
   (b) heating and melting the composition, and
   (c) melt-casting the melted composition so as to form an optical cellulose ester film,
   wherein the composition contains the hydrogen bonding solvent (D) in an amount of 0.1-5 parts by weight with respect to 100 parts by weight of the cellulose ester; and the optical cellulose ester film contains the hydrogen bonding solvent (D) in an amount of 0.005-2.0 parts by weight with respect to 100 parts by weight of the cellulose ester.

2. The method as claimed in claim 1, further comprising: removing the hydrogen bonding solvent (D) after the step of melt-casting.

3. The method as claimed in claim 1, wherein the hydrogen bonding solvent (D) is at least one of alcohols, ketones, and ethers.

4. The method as claimed in claim 1, wherein the hydrogen bonding solvent (D) is a water-soluble solvent.

5. The method as claimed in claim 4, wherein the water-soluble solvent is at least one of methanol, ethanol, propanol, isopropanol, ethylene glycol, glycerin, acetone, and tetrahydrofuran.

* * * * *